United States Patent
Babun et al.

(10) Patent No.: US 10,027,697 B1
(45) Date of Patent: Jul. 17, 2018

(54) DETECTION OF COUNTERFEIT AND COMPROMISED DEVICES USING SYSTEM AND FUNCTION CALL TRACING TECHNIQUES

(71) Applicants: Leonardo Babun, Miami, FL (US); Hidayet Aksu, Miami, FL (US); A. Selcuk Uluagac, Miami, FL (US)

(72) Inventors: Leonardo Babun, Miami, FL (US); Hidayet Aksu, Miami, FL (US); A. Selcuk Uluagac, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/581,453

(22) Filed: Apr. 28, 2017

(51) Int. Cl.
*G06F 12/14* (2006.01)
*H04L 29/06* (2006.01)

(52) U.S. Cl.
CPC .................. *H04L 63/1425* (2013.01)

(58) Field of Classification Search
None
See application file for complete search history.

(56) References Cited

U.S. PATENT DOCUMENTS

| | | | | |
|---|---|---|---|---|
| 7,975,306 B2* | 7/2011 | Chess | .................. | G06F 21/54 713/188 |
| 2005/0065994 A1* | 3/2005 | Creamer | .................. | G06F 9/485 709/202 |
| 2007/0250930 A1* | 10/2007 | Aziz | .................. | G06F 21/554 726/24 |
| 2014/0023067 A1* | 1/2014 | Brittain | .................. | H04L 47/745 370/352 |
| 2014/0026204 A1* | 1/2014 | Buntinx | .................. | H04L 63/062 726/9 |
| 2016/0164901 A1* | 6/2016 | Mainieri | .................. | G06N 7/005 726/23 |
| 2016/0239596 A1* | 8/2016 | Pieczul | .................. | G06Q 30/02 |
| 2016/0300252 A1* | 10/2016 | Frank | .................. | G06Q 30/0203 |
| 2016/0371490 A1* | 12/2016 | Shakarian | ............ | G06N 99/005 |

OTHER PUBLICATIONS

Yan et al., "A survey on cyber security for smart grid communications," IEEE Communications Surveys and Tutorials, fourth quarter, 2012, pp. 998-1010, vol. 14, No. 4.

(Continued)

*Primary Examiner* — Brandon S Hoffman
(74) *Attorney, Agent, or Firm* — Saliwanchik, Lloyd & Eisenschenk

(57) ABSTRACT

Frameworks, methods, and systems for securing a smart grid are provided. A framework can include data collection, call tracing techniques, and preparing call lists to detect counterfeit or compromised devices. The call tracing techniques can include call tracing and compiling all system and function calls over a time interval. The framework can further include data processing, in which a genuine device is identified and compared to unknown devices. A first statistical correlation can be used for resource-rich systems, and a second statistical correlation can be used for resource-limited systems. Threats of information leakage, measurement poisoning and store-and-send-later can be considered.

20 Claims, 10 Drawing Sheets

(56) References Cited

OTHER PUBLICATIONS

National Institute of Standards and Technology, "NIST framework and roadmap for smart grid interoperability standards, release 3.0," NIST Special Publication 1108r3, Sep. 2014, pp. iii-212.
Van Opstal, "Supply chain solutions for smart grid security: building on business best practices," U.S. Resilience Project, Sep. 2012, pp. 1-32.
Koushanfar et al., "Can EDA combat the rise of electronic counterfeiting," Proceedings of DAC: Design Automation Conference, Jun. 3-7, 2012, pp. 1-7, San Francisco, California.
Huang et al., "Counterfeit electronics: a rising threat in the semiconductor manufacturing industry," International Test Conference (ITC), Sep. 6-13, 2013, pp. 1-4, Anaheim, California.
Mo et al., "Cyber-physical security of a smart grid infrastructure," Proceedings of the IEEE, Jan. 2012, pp. 195-209, vol. 100, No. 1.
Guin et al., "Counterfeit integrated circuits: a rising threat in the global semiconductor supply chain," Proceedings of the IEEE, Aug. 2014, pp. 1207-1228, vol. 102, No. 8.
Kriger et al., "A detailed analysis of the GOOSE message structure in an IEC 61850 standard-based substation automation system," International Journal of Computers Communications and Control, Oct. 2013, pp. 708-721, vol. 8, No. 5.
"Introduction to NISTIR 7628: guidelines for smart grid cyber security," The Smart Grid Interoperability Panel-Cyber Security Working Group, Sep. 2010, pp. 1-137, F-1-J-12.
Formby et al., "Who's in control of your control system? Device fingerprinting for cyber-physical systems," NDSS: Network and Distributed System Security Symposium, Feb. 20-23, 2016, pp. 1-15, San Diego, California.
Guin et al., "Anti-counterfeit techniques: from design to resign," Proceedings of the 14th International Workshop on Microprocessor Test and Verification, Dec. 11-13, 2013, pp. 1-6.
Fries et al., "Security for the smart grid-enhancing IEC 62351 to improve security in energy automation control," International Journal on Advances in Security, 2010, pp. 169-183, vol. 3, Nos. 3 and 4.
Li et al., "Securing smart grid: cyber attacks, countermeasures, and challenges," IEEE Communications Magazine, Aug. 2012, pp. 38-45.
Deng et al., "Vulnerabilities and countermeasures-a survey on the cyber security issues in the transmission subsystem of a smart grid," Journal of Cyber Security and Mobility, 2012, pp. 251-276, vol. 1.
Komninos et al., "Survey in smart grid and smart home security: issues, challenges and countermeasures," IEEE Communications Surveys and Tutorials, Apr. 24, 2014, pp. 1933-1954, vol. 16, No. 4.
Sikdar et al., "Defending synchrophasor data networks against traffic analysis attacks," IEEE Transactions on Smart Grid, Dec. 2011, pp. 819-826, vol. 2, No. 4.
Sathyanarayana et al., "A network-based approach to counterfeit detection," IEEE International Conference on Technologies for Homeland Security (HST), Nov. 12-14, 2013, pp. 1-7, Waltham, Massachusetts.
Cobb et al., "Physical layer identification of embedded devices using RF-DNA fingerprinting," The 2010 Military Communications Conference-Unclassified Program-Waveforms and Signal Processing Track, Oct. 31-Nov. 3, 2010, pp. 682-687, San Jose, California.
Collier et al., "Cybersecurity standards: managing risk and creating resilience," Computer, Sep. 2014, pp. 70-76.
Garfinkel, "Traps and pitfalls: practical problems in system call interposition based security tools," Proceedings of the 10th Annual Network and Distributed Systems Security Symposium, Feb. 6-7, 2003, pp. 1-14, San Diego, California.
Jain et al.,"User-level infrastructure for system call interposition: a platform for intrusion detection and confinement," Proceedings of Network and Distributed System Security Symposium, Feb. 4-5, 1999, pp. 1-16, San Diego, California.
Hunt et al., "Detours: binary interception of win32 functions," Proceedings of the third USENIX Windows NT Symposium, Jul. 12-13, 1999, pp. 1-10, Seattle, Washington.
Kim et al., "Practical and effective sandboxing for non-root users," Proceedings of 2013 USENIX Annual Technical Conference (USENIX ATC '13), Jun. 26-28, 2013, pp. 139-144, San Jose, California.
Guo et al., "CDE: using system call interposition to automatically create portable software packages," Proceedings of the 2011 USENIX Annual Technical Conference, Jun. 15-17, 2011, pp. 1-6.
Eskin et al., "Modeling system calls for intrusion detection with dynamic window sizes," Proceedings of DARPA Information Survivability Conference and Exposition II, Jun. 12-14, 2001, pp. 1-11, Anaheim, California.
Feng et al., "Anomaly detection using call stack information," Proceedings of the 2003 IEEE Symposium on Security and Privacy, May 11-14, 2003, pp. 1-14, IEEE Computer Society, Berkeley, California.
Milea et al., "NORT: runtime anomaly-based monitoring of malicious behavior for windows," Proceedings of the Second International Conference on Runtime Verification (RV'11), Sep. 27-30, 2011, pp. 115-130, San Francisco, California.
Sekar et al., "A fast automaton-based method for detecting anomalous program behaviors," Proceedings of the 2001 IEEE Symposium on Security and Privacy, May 14-16, 2001, pp. 1-12, Washington, DC.
Corrigan-Gibbs et al., "Recommendations for randomness in the operating system or, how to keep evil children out of your pool and other random facts," Proceedings of the 15th USENIX Conference on Hot Topics in Operating Systems, May 18-20, 2015, pp. 1-8, Switzerland.
Honeywell Proprietary, "RTU2020 Remote Terminal Unit Specification," SC03-300-101, Release 101, Oct. 2014, pp. 1-17, Version 1.0.
Kerrisk, "Linux Programmer's Manual: LD.SO(8)," The Linux man-pages project, May 3, 2017, pp. 1-10, http://man7.org/linux/man-pages/man8/ld.so.8.html.
Kerrisk, "Linux Programmer's Manual: PTRACE(2)," The Linux man-pages project, May 3, 2017, pp. 1-30, http://man7.org/linux/man-pages/man2/ptrace.2.html.
Kanovsky et al., "Detection of electronic counterfeit components," Proceedings of the 16th International Scientific Conference on Electric Power Engineering, May 20-22, 2015, pp. 1-5.
Saeed et al., "An NFC based consumer-level counterfeit detection framework," Proceedings of the 2013 Eleventh Annual Conference on Privacy, Security and Trust (PST), Jul. 2013, pp. 135-142.
Obeng et al., "Hardware security through chain assurance," 2016 Design, Automation and Test in Europe Conference and Exhibition, Mar. 2016, pp. 1535-1537.
"Communication networks and systems in substations—Part 7-1: Basic communication structure for substation and feeder equipment—Principles and models," IEC 61850-7-1 International Standard, 2003, pp. 1-116.
"Communication networks and systems in substations—Part 8-1: Specific communication service mapping (SCSM)—Mappings to MMS (ISO 9506-1 and ISO 9506-2) and to ISO/IEC 8802-3," IEC 61850-8-1 International Standard, 2004, pp. 1-140.
"Communication networks and systems in substations—Part 7-2: Basic communication structure for substation and feeder equipment—Abstract communication service interface (ACSI)," IEC 61850-7-2 International Standard, 2003, pp. 1-178.
O'Brien et al., "Counterfeit mobile devices—the duck test," 2015 10th International Conference on Malicious and Unwanted Software (MALWARE), Oct. 2015, pp. 144-151.
Wang et al., "Cyber security in the smart grid: survey and challenges," Computer Networks, Apr. 2013, pp. 1344-1371, vol. 57.
"Open source libraries for IEC 61850 and IEC 60870-5-104," Libiec61850.com, Feb. 2016, http://libiec61850.com/libiec61850/documentation/.

* cited by examiner

Normalized Rate of System Calls Detected After Using Our Framework for Detecting Counterfeit Resource-Limited Devices (E.G., RTUs, PLCs)

|  | Type of call | Orig. | $CD_1$ | $CD_2$ | $CD_3$ |
|---|---|---|---|---|---|
| ptrace | brk | 1 | 1 | 6.7 | 1 |
|  | clone | 1 | 12.5 | 1 | 1 |
|  | close | 1 | 1 | 1 | 3.2 |
|  | fstat64 | 1 | ~1 | 1 | 8.8 |
|  | llseek | 0 | 0 | 0 | Inf |
|  | lseek | 1 | 1 | 1 | 1 |
|  | mmap2 | 1 | 2.4 | 4.4 | 2.4 |
|  | mprotect | 1 | 2.8 | 1.1 | 1 |
|  | munmap | 1 | 1 | 2 | 13 |
|  | open | 1 | 1 | 1 | 5 |
|  | rt_sigprocmask | 1 | 8.7 | 0.3 | 0.3 |
|  | rt_sigaction | 1 | 1 | 3 | 3 |
|  | write | 0 | 0 | 0 | Inf |
| Interposition | close | 1 | 1 | 1 | 1 |
|  | free | 1 | 3.2 | ~1 | ~1 |
|  | malloc | 1 | 3.3 | ~1 | ~1 |
|  | memcpy | 1 | 1 | 1 | 1 |
|  | memset | 1 | 1 | 1 | 1 |
|  | mmap | 1 | 12.5 | 1 | 1 |
|  | mprotect | 1 | 12.5 | 1 | 1 |
|  | pthread_create | 1 | 12.5 | 1 | 1 |
|  | sendto | 1 | 4.3 | ~1 | ~1 |
|  | signal | 1 | 24 | 1 | 1 |
|  | socket | 1 | 1 | 1 | 1 |
|  | usleep | 1 | 3.5 | ~1 | ~1 |

Figure 13

Normalized Rate of System Calls Detected After Using Our Framework for Detecting Counterfeit Resource-Rich Devices (E.G., PMUs, IEDs)

|  | Type of call | Orig. | $CD_4$ | $CD_5$ | $CD_6$ |
|---|---|---|---|---|---|
| ptrace | brk | 1 | 1 | 8.3 | 1 |
|  | clone | 1 | 23 | 1 | 1 |
|  | close | 1 | 6.5 | 6.8 | 6.75 |
|  | fstat | 1 | 12 | 12.5 | 12.25 |
|  | lseek | 0 | Inf | Inf | Inf |
|  | mmap | 1 | 4.1 | 6.64 | 2.6 |
|  | mprotect | 1 | 3.4 | 1.1 | 1 |
|  | munmap | 1 | 23 | 26 | 24 |
|  | open | 1 | 6.5 | 6.75 | 6.8 |
|  | rt_sigaction | 1 | 8.3 | 1 | 1 |
|  | write | 0 | Inf | Inf | Inf |
| Interposition | free | 1 | 15.6 | ~1 | ~1 |
|  | malloc | 1 | 15.6 | ~1 | ~1 |
|  | memcpy | 1 | 17.8 | 1.1 | ~1 |
|  | memset | 1 | 24 | 1 | 1 |
|  | mmap | 1 | 24 | 1 | 1 |
|  | mprotect | 1 | 24 | 1 | 1 |
|  | pthread_create | 1 | 24 | 1 | 1 |
|  | pthread_detach | 1 | 24 | ~1 | 1 |
|  | recvfrom | 1 | 15.7 | ~1 | ~1 |
|  | signal | 1 | 24 | 1 | 1 |
|  | socket | 1 | 24 | 1 | 1 |
|  | usleep | 1 | 15.7 | ~1 | ~1 |

Figure 14

DETECTION OF COUNTERFEIT AND COMPROMISED DEVICES USING SYSTEM AND FUNCTION CALL TRACING TECHNIQUES

STATEMENT OF GOVERNMENT SUPPORT

This invention was made with government support under Grant No. DE-OE0000779 awarded by the Department of Energy. The government has certain rights in the invention.

BACKGROUND

Substantial efforts to modernize the traditional power grid to the next generation of technology, i.e., the smart grid, are underway. The core concept of the smart grid is the realization of two-way communications between smart devices. This permits new functionalities, distributed intelligence, and state-of-the-art communication capabilities which make the smart grid infrastructure superior to the traditional power grid. Indeed, the success of the smart grid vision depends on the integration of underlying electrical distribution infrastructure with communication networks. Such integration changes the way electrical power is generated and delivered to customers.

The integration of complex and heterogeneous networks into the smart grid must be done in an efficient, but also a secure manner. The information technology (IT) systems and devices attached to the smart grid must guarantee the security and privacy of users and their power usage. First, the integrity of smart grid's measurement and device information data needs to be protected. Second, the security mechanisms have to guarantee the protection of commands and software capabilities of the devices that support the control and management operations of the smart grid. With all its dependency upon device communications, the smart grid is highly vulnerable to any security risk stemming from devices. In particular, the use of counterfeit or compromised devices can wreak havoc on the smart grid's critical functionalities. Counterfeit or compromised devices can cause catastrophic consequences to the integrity of the smart grid data and users privacy. Counterfeiting accounts for at least $7.5B in lost revenue for U.S. semiconductor companies. The consequences of such counterfeit device-based attacks on the smart grid can be even more severe causing, for instance, major blackouts. Therefore, new methods and apparatuses are in demand to help protect and secure smart grids.

BRIEF SUMMARY

Embodiments of the present invention include frameworks, methods, and systems for securing a smart grid. Embodiments of the present invention can include data collection and data processing. The data collection can include function and system call tracing techniques. A portion or all system and function calls raised during a time interval can be traced, captured, processed, and listed. The data processing can include identifying a genuine device (or real or ground truth device) and comparing and correlating the call lists of the genuine device with the call lists of unknown devices (i.e., potentially counterfeit or compromised devices).

The frameworks can include a basic and an advanced statistical correlation to detect counterfeit devices. The basic statistical correlation can be used for low entropy systems, and the advanced statistical correlation can be used for high entropy systems. The basic statistical correlation can include analyzing system and function call type, amount, and order. Furthermore, as described herein, the term "system call(s)" can refer to the concepts of system calls, function calls, and the functional aspects of system calls. Statistical analysis can be performed on random variables obtained after assigning configurable weights for different types of system calls depending on system call importance and application. The advanced statistical correlation can include removing randomness and creating new random variables from system call lists.

The genuine device can be found, screened for, or determined using autocorrelation values between different realizations of the genuine device's own system call lists. The data processing can include comparing system call appearance frequency and the order in which system calls are raised. The call tracing techniques can include dynamic library interposition and reverse engineering with ptrace.

The data processing can include direct system call comparison (e.g., looking for extra system/function call activity that can indicate the presence of a counterfeit device). The number of system calls (including the number of different system calls) for each device can be averaged, normalized, and compared to a genuine device. Unknown devices can be compared to a genuine device based on type and frequency of system calls. However, the order of system calls and the value of parameters from the system calls do not have to be considered.

There are several benefits associated with the frameworks of the present invention including: (1) Excellent detection rates: frameworks of the present invention have shown to be well suited for detecting counterfeit (or compromised) smart grid devices by combining up to three different detection methods—system call comparison, statistical-correlation-basic, and statistical-correlation-advanced. (2) Minimum overhead: based on experimental results, frameworks of the present invention have been shown to not have a significant impact on computing resources. (3) Specific vs. generic solution: frameworks of the present invention can address the specific problem of counterfeit smart grid device detection. The adversary and system models proposed follow the security requirements and architecture characteristics of the smart grid. However, the approaches used for counterfeit smart grid detection (Algorithms 1 to 4) are perfectly suitable for other security domains outside the smart grid and they can be used in several other applications. (4) Comprehensive adversary model: the adversary model used includes resource-limited and resource-rich counterfeit devices with a total of six different types of counterfeit smart grid devices. The counterfeit or compromised devices are defined based on their resource availability and the impact of their malicious activity on the smart grid. (5) Counterfeit and compromised device diversity: frameworks of the present invention are suitable for any type of counterfeit device. The system level framework design is also suitable for detecting hardware counterfeiting. System call comparison and statistical correlation are powerful tools capable of detecting changes in hardware and system configuration. This makes frameworks of the present invention attractive tools for monitoring and detecting any type of counterfeit devices.

In order to test frameworks of embodiments of the present invention, a realistic representative smart grid testbed was designed that performs essential operations conforming to the International Electrotechnical Commission 61850 (IEC61850). IEC61850 is a protocol suite that defines the communication standards for electrical substation automation systems. The testbed included both resource-limited (e.g., Remote Terminal Units (RTUs), Programmable Logic Controllers (PLCs)) and resource-rich (e.g., Phasor Measurement Units (PMUs), Intelligent Electronic Devices (IEDs)) devices. The devices use open source libiec-61850 libraries to exchange smart grid time-critical device messages using the GOOSE format.

In the adversary model, six different types of counterfeit devices with different computing resources and hardware capabilities were considered. The adversary model also complied with the security requirements defined by the National Institute of Standards and Technology (NIST) for smart grids.

Experimental results demonstrate an excellent detection rate for the counterfeit smart grid devices. Additionally, detailed performance analysis shows minimum overhead on the use of computing resources (i.e., CPU, memory, etc.). On average, memory utilization did not increase more than 0.03% of total device memory while real, system, and user time did not increase more than 230 ms for even the worst case scenario (resource-limited device). These results were obtained by comparing smart grid device application metrics with and without using the techniques of the present invention.

BRIEF DESCRIPTION OF DRAWINGS

FIG. 13 shows a table of system calls.

FIG. 14 shows a table of system calls.

DETAILED DESCRIPTION

Much of the related art has analyzed the counterfeit device problem as a supply chain dilemma and normally focuses on facilitating better control mechanisms and applying the best business practices as possible solutions. Embodiments of the present invention, on the other hand, focuses on how to monitor and detect counterfeit or compromised devices once they manage to break security breaches of the supply chain and become part of the smart grid architecture.

Embodiments of the present invention include a configurable system-level framework that is capable of monitoring and identifying counterfeit or compromised devices that are performing unauthorized operations inside the smart grid architecture. Specifically, a framework of an embodiment of the present invention can utilize system and call tracing, and statistical techniques to monitor and detect counterfeit devices (the term "counterfeit devices" as used herein can also refer to "compromised devices," and vice versa) based on their behavioral characteristics.

The smart grid is a complex critical infrastructure where multiple heterogeneous networks are interconnected and exchange information and data with very high device diversity. As a basis for the present invention, an overview of the smart grid architecture and device diversity as well as the substation communication protocol IEC61850 will be provided. Furthermore, US NIST smart grid security requirements will be considered focusing on the threat that represents the use of counterfeit devices. Finally, the use of system and call tracing techniques are discussed.

Figure 1A:
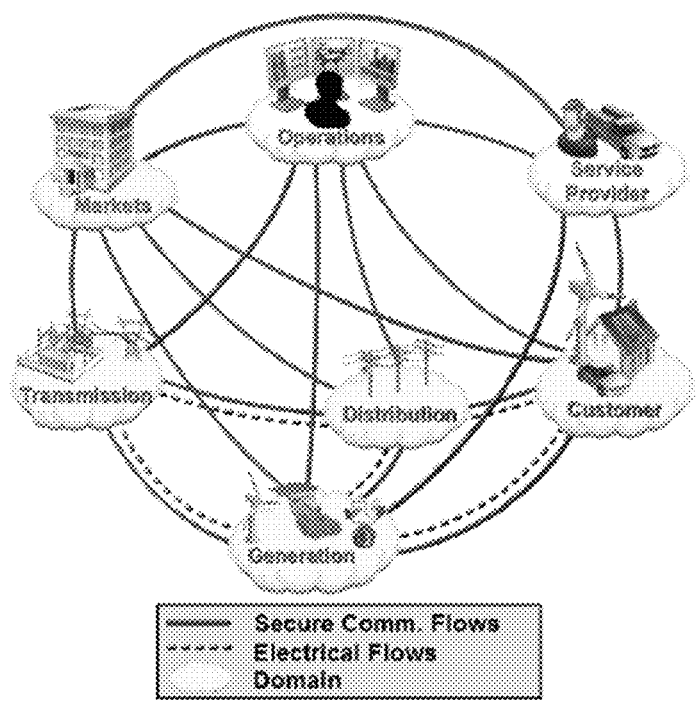
FIG. 1(a) is a diagram of an NIST smart grid conceptual model.

The NIST describes the smart grid as a set of seven interconnected domains. Three of these domains are responsible for the generation, transmission, and distribution of electricity supported by the two-way communications systems. A distribution domain of the NIST model as shown in FIG. 1(a) will be discussed. This domain acts as a communication and control hub between the rest of the domains represented in the model. Because of its important role inside the smart grid's communication architecture, the distribution domain is particularly attractive for cyber attackers.

Figure 1B:
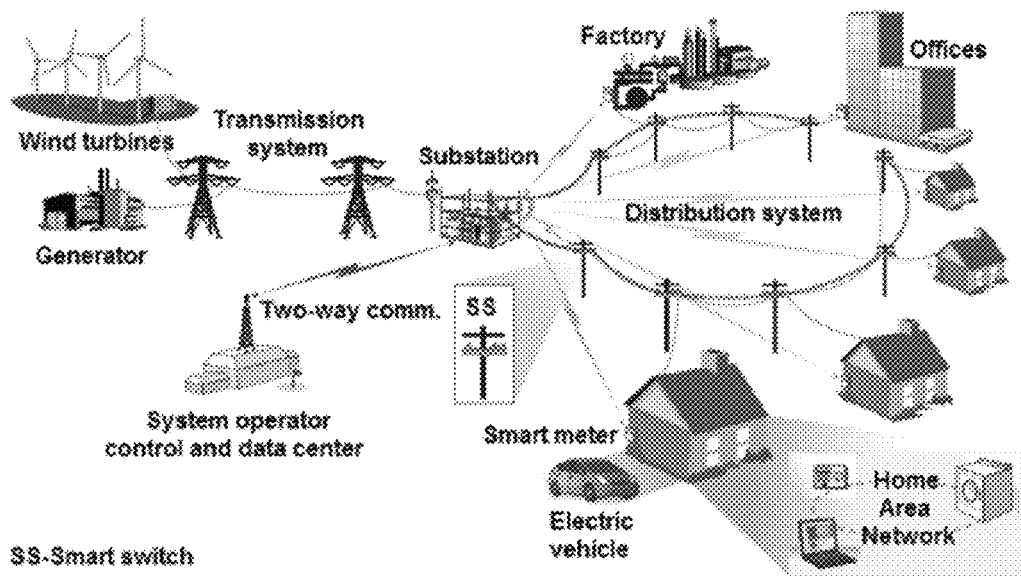
FIG. 1(b) is a diagram illustrating an example of smart grid infrastructure.

The smart grid can be viewed as a large heterogeneous network with vast device diversity. These devices are distributed through the entire smart grid architecture as shown in FIG. 1(b). In FIG. 1(b), the lower layer of the smart grid's architecture combines home area networks (within close vicinity of a home), building area networks (local networks that cover entire buildings), and industrial area networks (networks that connect devices for factory automation and process control applications). These network deployments are in charge of interconnecting a huge set of different infrastructure devices with smart meters and energy management devices. The next level of the smart grid architecture interconnects (through smart meters and smart switches) all of these small networks from the lower layer with the smart grid substation. This link of communications helps data exchange between the different networks in the lower layer and the distribution access points (substations). Finally, at the top of this architecture is the system operator control and data center. All the data collected from the terminal users and previously aggregated at the substations is delivered to this top layer. The grid's head end, the Supervisory Control and Data Acquisition System (SCADA), is responsible for the acquisition, processing, presentation, and management of all the data received. Essentially, FIG. 1(b) demonstrates how both power grid and communication infrastructure coexist in the smart grid.

Figure 2A:
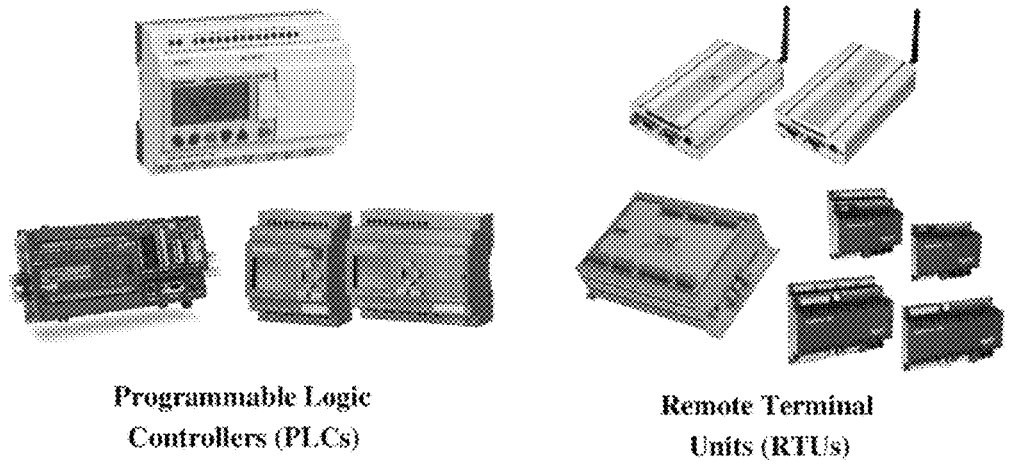
FIG. 2(a) shows examples resource-limited smart grid devices.

Smart grid devices can be categorized in two groups: resource-rich and resource-limited devices. Resource limited devices have simpler hardware and software architecture than resource-rich devices. They normally run with low performance CPUs and have very limited memory resources. Resource-limited devices' behaviour is highly dependable on their programming architecture. Any slight change in their hardware or software configuration would be highly noticeable from resource-limited devices' demeanor. In general, these devices are built to perform very specific tasks inside the smart grid. Some devices in this group are PLCs and RTUs. In the context of the smart grid architecture, PLCs are responsible for reporting measurements from sensors and general smart grid status at any given time. RTUs are responsible for the transmission of telemetry data (e.g., remote sensor and meter data and reporting) to the upper layer of the architecture (see FIG. 2(a)).

Figure 2B:
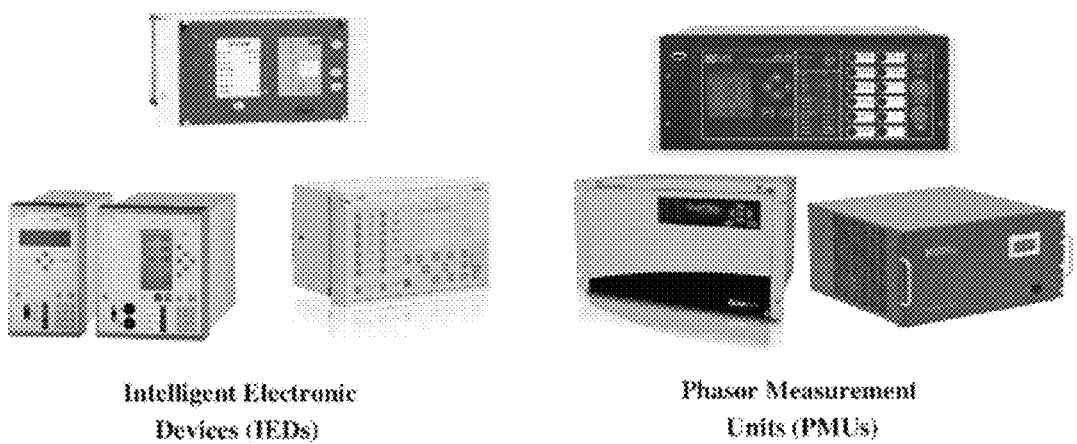
FIG. 2(b) shows examples of resource-rich smart grid devices.

Resource rich devices are closer in configuration to full capacity computers. They typically have a full Operating System (OS) and higher computing resource availability compared with resource-limited devices. In general, they have fast and even multi-core processors with significant cache and RAM. Also, resource-rich devices can perform context switching between a wide range of processes running on the device. This type of device can execute several different and very specialized tasks inside the smart grid. Some devices in this group are IEDs and PMUs. Particularly, IEDs enable local and remote sensing and control of substation equipment. On the other hand, PMUs provide the power system a more precise and real-time measurement for estimating the electrical system state (see FIG. 2(b))

Counterfeit devices can be classified into several categories. They can be found from inexpensive rough copies to high-quality reversed engineered identical copies of an original product. In a smart grid, due to the specific market and application of these devices, the most common cases of counterfeiting fall into the categories of cloned and tampered devices. Cloning is widely used by a range of counterfeiters to copy a design. In this case, reverse engineering or illegal copies of intellectual property (IP) can be used in order to eliminate the large development cost of parts. On the other hand, tampering with a genuine smart grid device can be done by adding hardware components or logic to open back-doors and steal information from the devices. Specifically, software tampering can add pieces of malicious code to smart grid devices' OSs and drivers in order to change the device's functionality. For instance, attackers can tamper with or compromise smart meters and try to steal sensitive user information. Attackers can also install malicious code within critical devices of the smart grid distribution domain (PMU's, RTUs, IDEs, etc.) and perform attacks with catastrophic consequences. The proposed adversary model and system-level counterfeit or compromised device detection frameworks of an embodiment of the present invention are cognizant of all these different counterfeiting methods.

IEC61850 protocol is the future communication standard for electrical substation automation systems. This standard is designed with a number of underlying protocol stacks to support a variety of time-critical services and monitoring activities. IEC61850 supports real time operations, abstracts services, and interoperability between devices used in energy automation. This protocol explicitly defines timing requirements for information and data exchange in power substations. IEC61850 also enables continuous low-latency communication from control stations to decentralized energy generators. It is mainly used for reporting status and transmitting sampled values (e.g., protection relay signals) from IEDs to substation automation controllers as well as for transmitting commands from substation automation controllers to IEDs Another important feature of IEC61850 is that it addresses data exchange on three different levels—the process level, field level, and station level. Finally, this protocol is also responsible for the communication between IEDs using GOOSE messages. GOOSE constitutes a model of data format that ensures the same Generic Substation Event (GSE) message is received through multicast or broadcast by multiple different devices. GOOSE data is inserted into Ethernet packets and normally works on a publisher-subscriber communication mechanism.

Availability, integrity, and confidentiality are three main cyber security objectives of the smart grid. Embodiments of the present invention take into consideration the guidelines that the NIST has established for the smart grid. The US NIST summarizes the following security requirements for the smart grid: (1) Attack detection and resilient operations—the smart grid communication network needs to consistently perform monitoring activities in order to detect and identify abnormal activities and incidents due to attacks. Additionally, the network needs to have self-healing ability to continue performing critical operations in the middle of the attacks. (2) Identification, authentication, and access control—identification and authentication becomes critical in networks like the smart grid, capable of connecting millions of different devices. In this context, identification and authentication are the key processes of verifying the identity of a device or a user as a prerequisite for granting access to the smart grid network resources. Additionally, access control has to be guaranteed so only those with the proper privilege can have access to sensitive information or can control critical infrastructures. (3) Secure and efficient communication protocols—in a smart grid, message exchange has to be done in a secure and timely manner, particularly in distribution and transmission domains. There is a trade-off between security and the speed of high-bandwidth communication so optimal protocols are required to ensure both communication efficiency and information.

Counterfeit smart grid device detection frameworks of embodiments of the present invention cover these NIST requirements by directly addressing the attack detection and identification requirements. Also, the frameworks of embodiments of the present invention can guarantee secure and efficient smart grid communications and control requirements via detecting counterfeit devices. The frameworks can also meet the identification requirement by individually catching counterfeit devices. Indirectly, the frameworks can also provide resilience and access control to the smart grid by eliminating unauthorized network operations performed by counterfeit devices.

In the smart grid, most of the devices use old C-based computer programs. The use of C-based operating systems and drivers is convenient in cases where: (1) the memory space available is limited; and (2) applications need fast and efficient access to low-level native functions. For these reasons, embodiments of the present invention can also be implemented as a C-based application. Additionally, the realistic testbeds utilize open source libraries. The use of open source software gives frameworks of embodiments of the present invention several advantages: first, the methods of embodiments of the present invention can be more flexible; second, frameworks of embodiments of the present invention are more open to customizations and can be highly configurable; and finally, there are more opportunities to adapt the methods of embodiments of the present invention to other open standards that increase interoperability. Therefore, in order to keep the frameworks of embodiments of the present invention open source, methods of embodiments of the present invention have been implemented on Linux based systems. One advantage of using Linux is that it allows easy access to Unix-based system call tracing applications like Process Trace (ptrace). Additionally, environment libraries like LD PRELOAD can be defined to implement library interposition.

Two different hooking techniques, ptrace (which performs function call tracing) and library interposition (that performs system call tracing using the environment library LD PRELOAD), can be utilized in frameworks of the present invention. By utilizing and comparing the performance of function and system calls, device behavior can be analyzed from the user and kernel levels, respectively. Details of these two techniques as well as their applications in counterfeit device detection frameworks of the present invention will now be discussed.

The system call tracing technique is dynamic library interposition. Most C-compiled programs use a shared library defined inside the runtime library to communicate with the kernel. Once the C program is loaded by the linker, the connection between the program and that shared object is established. Linux-based systems use an environment variable named LD PRELOAD to define the shared object before it is loaded by the dynamic linker. This shared object can contain custom definitions of system call functions, sharing the same name of the original system call functions defined by the Kernel. Then, when the shared object is loaded, the custom system call functions are called (FIG. 3(a)). This process permits the shared object to intercept the runtime library's original functions and replace them with the custom definitions of the same functions. This process is known as Library Interposition and constitutes a powerful tool to take control of the program's behavior. Embodiments of the present invention can incorporate library interposition to obtain detailed information about how the system calls are triggered (including the type and amount) while smart grid devices are communicating in the testbed.

The function call tracing technique is reverse engineering with ptrace. This method is used to trace the way function calls are being triggered during C-compiled program execution. It uses a system call defined in Unix-based systems called Process Trace or ptrace. The way ptrace works is different than library interposition. In ptrace, the method uses an extra process that acts as a parent for the C compiled program to be traced. Once the external process attaches to its child, the external process can start controlling its child by querying its state, controlling the delivering of signals, or waiting until the child performs a system call. In this last case, when a system call is triggered, the parent is called twice (right before the Kernel starts processing the system call and right after it finishes) (FIG. 3(b)). Therefore, the parent has full control of every time the child application raises a system call. Similar to library interposition, embodiments of the present invention can use ptrace to obtain information about how the system calls are triggered while the devices in the realistic smart grid testbed are communicating. Some of the information that is captured includes type of system calls (i.e., system and/or function calls), average amount of system call per type, the order in which the system calls are being triggered, and finally, the value of important parameters defined in every system call (e.g., the size of allocated memory from every malloc call).

An overview of related work on smart grid security threats will now be given. In general, cyber-attacks against smart grids can be categorized in four different groups: denial of services (DoS) attacks, malicious data injection attacks, traffic analysis attacks, and high-level application attacks. Several examples of DoS attacks impacting different parts of the smart grid architecture have been document including malicious data injection. Two variants of these attacks can be considered—the strong attack regime and the weak attack regime. In traffic analysis attacks, it has been shown how an attacker can monitor and intercept the frequency and timing of transmitted messages with the intention of deducing information and user's behavior. High-level application attacks have been shown as a way an attacker can disrupt the basic functions of a power system (state estimation, power flow measurement, etc.). All of this work is useful, but none of it directly covers the emerging threat of counterfeit devices in the smart grid.

The use of counterfeit devices in the smart grid is a type of threat that could be related to high-level application attacks. Generally, researchers and cyber security analysts isolate the problem of counterfeiting to the smart grid supply chain. Different approaches for detection of fake electronic components have been presented. These works are mainly focused on hardware counterfeit detection. A network-based counterfeit device detection technique that analyzes network traffic in order to detect hardware-based counterfeit devices has been proposed. Although this is an interesting concept, network dynamics (e.g. delay, etc.) can have an adverse effect on the detection mechanism. The problem of device counterfeiting has been defined as when a compromised or false electronic component or board is used in part or in the total process of assembling a smart grid function-critical device. The consequences of using an untrusted hardware component in any part of the smart grid could result in malfunctioning of sections or the entire smart grid network. Also, the poisoning of critical measurements can represent a real challenge for smart grid control centers. In both cases, the trust of the entire system would be compromised. The use of counterfeit hardware could also generate increased amounts of electromagnetic emissions (EME) and change power consumption to unusual levels that could be used later by attackers to track and steal information from the device. Back-doors and kill switches are other examples of mechanisms an attacker could use to get into a compromised device inside the smart grid network. Malicious code can also be inserted and hidden between legitimate lines of code or libraries so they can be used later to steal information or compromise the smart grid system. The attacker can use a Trojan that is activated by commands used by the smart grid networking protocols (via storing and sending at a later time). In a simpler variant, the attacker can insert small portions of malicious code inside legitimate libraries with the intention of creating parallel communication channels and steal sensitive data. Many researchers and cyber security authorities have tried to find solutions to the problem of counterfeit devices being used in the smart grid. Intelligent secure packaging, outbound beaconing, and better tracking systems are some of the countermeasures that are proposed to fight against counterfeiting on the supply chain side. However, skilled attackers could have remote access to legitimate devices (e.g., RTUs, PMUs, IEDs, etc.) and create opportunities for tampering with smart grid devices outside the smart grid supply chain. Additionally, the proposed mechanisms for protecting and monitoring the supply chain against counterfeiting are far from infallible. The reality is counterfeit devices constitute a big problem for smart grid security and account for at least $7.5B in lost revenue for U.S. semiconductor companies.

Moreover, since system call tracing techniques constitute a powerful method for regulating and monitoring application behavior, they have been largely used in security applications. Specifically, system call tracing techniques can be found in applications such as intrusion detection and confinement, binary detection of OS functions, sand-boxing, and software portable packages. Specifically, system call tracing has been used for implementing intrusion detection systems (IDS). Furthermore, anomaly detection mechanisms based on information obtained from analyzing system call behavior has been proposed. In these cases, the implementation of the monitoring tools was too heavy in terms of system overhead. One similar application with improved system overhead has been proposed in which the tool is required to run continuously and serves the purpose of complementing antivirus software.

Embodiments of the present invention analyze the problem of counterfeit devices after they manage to break the security of the smart grid supply chains. Frameworks of embodiments of the present invention can be applied to monitoring and detecting counterfeit devices while they are performing unauthorized operations inside the smart grid architecture. Embodiments of the present invention are different from other related art solutions which, in most cases, only focus on prevention. In fact, these solutions are not intended to address the problem of counterfeit devices outside the supply chain. As has been discussed, there are also different approaches that are being used for the detection of counterfeit devices and monitoring of application behavior. In none of these cases is the solution intended for the smart grid domain. Additionally, in order to succeed, these solutions need to be monitoring constantly-changing environments like network traffic and computational systems. This constitutes a limitation in terms of system overhead and resource utilization. On the other hand, frameworks of embodiments of the present invention can operate on a simpler model and are lightweight in terms of system overhead while providing excellent detection rates of counterfeit smart grid devices.

An adversary model is used to define the threats caused by the counterfeit smart grid devices and the way attacks can be perpetrated. Fake, counterfeit, or compromised smart grid devices (e.g., RTUs, PMUs, IEDs, etc.) can be determined as genuine devices having malicious functions installed. The malicious functions can be due to a counterfeited hardware or software components on a smart grid device otherwise assumed to be genuine. The malicious function can change the basic operations of the original device and can be installed in one of the supply chain stages or while performing a software upgrade in the field.

The adversary model considers, conforming to the US NIST guidelines, three possible threats in the smart grid related to counterfeit (or compromised) devices: (1) Information leakage—the counterfeit smart grid device can open additional communication channels to leak valuable smart grid information to adversaries (e.g., another untrusted insider or outsider); (2) Measurement poisoning—counterfeit smart grid device can generate fake data that can be used to poison the real status of the smart grid; (3) Store-and-send-later—a fake device can store information in hidden files that can be recovered later by an attacker.

Based on these three well-defined threats and considering both resource-limited and resource-rich smart grid devices, the adversary model defines six different counterfeit or compromised devices. Each counterfeit device reflects a different combination of the aforementioned three smart grid threats and the availability of resources in the devices. The six different counterfeit devices considered in this study are described as follows: (1) Counterfeit Device 1 (C $D_1$): the resource-limited device creates additional instances of the publisher object and starts leaking information through parallel communication channels; (2) Counterfeit Device 2 (C $D_2$): the resource-limited device allocates small and unauthorized amounts of memory to create fake data and poison real measurements; (3) Counterfeit Device 3 (C $D_3$): the resource-limited device creates unauthorized hidden files to store critical information that is retrieved later by the attacker; (4) Counterfeit Device 4 (C $D_4$): the resource-rich device creates additional instances of the subscriber object and starts leaking information through parallel communication channels; (5) Counterfeit Device 5 (C $D_5$): the resource-rich device allocates small and unauthorized amounts of memory to create fake data and poison real measurements; (6) Counterfeit Device 6 (C $D_6$): the resource-rich device creates unauthorized hidden files to store critical information that is retrieved later by the attacker. A summary of the adversary model is given in Table I.

It will be assumed that a counterfeit device will try to minimize its malicious activities and maximize its resemblance to legitimate device behavior. This permits the counterfeit device to remain undetectable inside the smart grid. For this purpose, the counterfeit smart grid device tries to reuse as many functions and processes from the legitimate applications as it can. Also, it performs its attacks following a Poisson distribution, which allows for randomly and efficiently spacing the attacks and constitutes a valid model to emulate the randomness of such events. However, other stochastic or deterministic models can also be utilized.

TABLE I

SUMMARY OF THE SIX DIFFERENT COUNTERFEIT DEVICES DEFINED IN OUR ADVERSARY MODEL BASED ON RESOURCE AVAILABILITY AND POSSIBLE IMPACT ON THE SMART GRID ARCHITECTURE.
Adversary Model

| Name | Resource availability | Impact |
| --- | --- | --- |
| $CD_1$ | Limited | Memory, communications |
| $CD_2$ | Limited | Memory, data, |
| $CD_3$ | Limited | Memory, confidentiality |
| $CD_4$ | Rich | Memory, communications |
| $CD_5$ | Rich | Memory, data |
| $CD_6$ | Rich | Memory, confidentiality |

The behavior of the counterfeit device is modeled as follows. Consider t=[0, T], the communication interval between the two smart grid devices. The probability of having an attack from a counterfeit device $CD_i \in \{CD_1, CD_2, CD_3, CD_4, CD_5, CD_6\}$ can be expressed as:

$$P_{cd} = \frac{\lambda^k e^{-\lambda}}{k!}, k \in \mathbb{R}, \tag{1}$$

where $\lambda$ is the average number of attacks in the interval t and k is the total number of attacks in the same interval.

In general, the increment sequence N(t) that models the aggregate attacks is defined by:

$$P(N(s+t) - N(s)) = e^{-\lambda t} \frac{(\lambda t)^k}{!k} \; k \in \mathbb{R}, s > 0, \tag{2}$$

where N (s+t)–N (s) is called a length t increment of the attack process N (t): t≥0.

Figure 4:
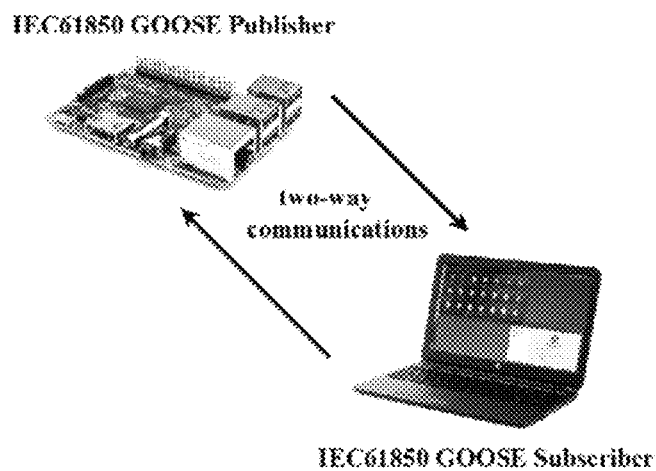
FIG. 4 is a diagram of a realistic smart grid testbed configuration using resource-rich and resource-limited devices conforming to IEC 61850 GOOSE.

Configurable frameworks for monitoring and detecting counterfeit devices in a smart grid will now be discussed. Frameworks of embodiments of the present invention consider a realistic scenario from a smart grid substation. The testbed's configuration includes a publisher-subscriber two-way communication configuration that sends and receives GOOSE messages. An open source version of IEC61850 protocol running on Linux-based systems is utilized. The use of open source software increases the framework's interoperability, flexibility, and allows for greater configurability and customization. As mentioned before, resource-rich and resource-limited devices are considered. The resource-limited device (GOOSE publisher) is assumed to run on Raspberry Pi 2B, using Advance RISC Machine (ARM) 32 bits architecture with limited memory and CPU resources. Implementing the publisher on the resource-limited device creates the worst-case scenario in terms of resource availability. The resource-rich device (GOOSE subscriber) runs on a Linux Ubuntu 14.04 virtual machine with a more powerful CPU and higher memory configuration (see FIG. 4). Implementing the subscriber on the resource-rich device creates the best-case scenario in terms of resource availability.

As the protocol IEC61850 states, one of the devices (publisher) opens the communication session and waits for the other device (subscriber) to connect. Once the socket is open on both sides, the publisher starts sending GOOSE messages to the subscriber every second for the next 60 seconds. After this time interval t, the communication channel is closed. It is assumed that, for all the counterfeit devices, the malicious threat will be active several times during every communication session following the Poisson attacker model. Frameworks of embodiments of the present invention can include three fundamental operations:

(1) Data collection: the proposed system call tracing techniques are applied. The objective is to trace and capture all the system calls raised during the interval in which the devices are communicating.

(2) Data processing: for detecting counterfeit smart grid devices, it is assumed there is a real device $D_0$ that can be trusted (ground truth device). In this step, up to three different detection approaches are applied to compare and correlate the system call lists (obtained in step 1) from the trusted device $D_0$ and the counterfeit or unknown devices.

The system call lists are compared based on parameters such as type of system call, frequency in which they appear, and order in which the system calls are raised.

(3) Decision: Finally, the decision algorithm processes the results from step 2 to decide if the devices are genuine or counterfeit.

The detection approaches of frameworks of embodiments of the present invention will now be described in detail. It will be assumed that all the devices are potentially counterfeit. However, a trusted device that will be used as a reference will be referred to as a ground truth device or a genuine device. The reference information regarding genuine and other devices can be stored in a database.

A database of different ground truth profiles (GTPs) from genuine smart grid devices can be created throughout the learning process. Different profiles can be created for different classes of devices that are performing different operations in the smart grid infrastructure. In order to be used for correlation analysis, the GTPs have to be obtained from smart grid devices that perform very stably while executing normal smart grid operations. In other words, the system/function call lists obtained from the same process and at different time intervals in the same device need to be highly correlated. This metric provides valuable information about the level of randomness inherent to system/function calls in ground truth devices. Random changes in device behavior can be considered malicious activity from compromised devices. The genuine devices with high levels of randomness (low autocorrelation) between similar processes ran in different time intervals may not be suitable as ground truth devices. To calculate autocorrelation between system/function call lists, a different weight i can be assigned to different types of system/function calls in the order they appear. The assignment of $\delta_i$ weights can be done randomly or by following a specific assignment criterion. This criterion can depend on the importance of the specific call, the type of application that is being evaluated, etc. (adaptive assignment). As a result of the assignment process, a random variable X can be obtained that takes values between $\delta_{min}$ and $\delta_{max}$. Finally, X can be used to calculate the Statistical-Autocorrelation-Simple, as described in Equation 9:

$$\rho X_i X_{i+t} = \frac{\sum x_i x_{i+t} - n \overline{x_i x_{i+t}}}{n s_{x_i} s_{x_{i+t}}}, \tag{9}$$

where $x_{i+t}$ represents a random variable from the same random process $x_i$, but from a different time interval t.

System/function call lists generally possess some degree of randomness. Particularly in the case of resource-limited systems, this randomness can be higher because of the limitation on available resources during demanding system operations. For resource-limited smart grid devices, finding high values of autocorrelation between similar processes running at different time intervals can be challenging. This is because the natural randomness of the OS' processes is enhanced by the lack of computing resources. Embodiments can make use of a statistical-autocorrelation-advanced technique. In this technique, the values X(i) to X(i+h) in X can be combined, resulting in a new random vector $X_0$ that is smaller in size and having a lower random component. The index h represents the number of individual calls from the original list that are being combined to create the new random value. This index value h is proportional with the amount of randomness and constitutes another configurable parameter in the framework. Finally, once generated, the GTPs can include the following information: (1) type and amount of system/function calls (TASC) and (2) the entire system/function call list (SCL), both triggered during the learning process (Equation 10).

$$GTP=\{\mu(TASC), SCL\},\qquad(10)$$

Figure 3A:
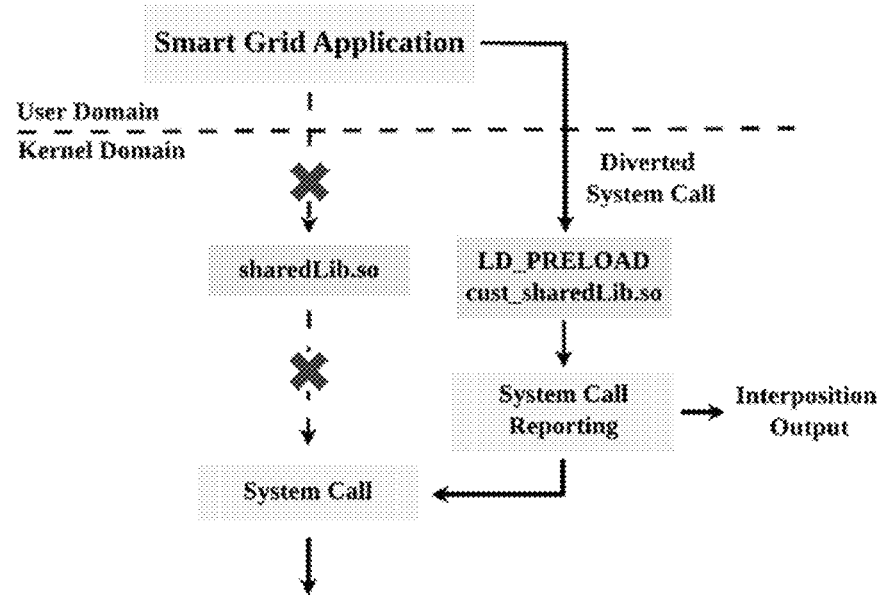
FIG. 3(a) is a diagram of function call tracing techniques of a framework of an embodiment of the present invention implemented using ptrace.
Figure 3B:
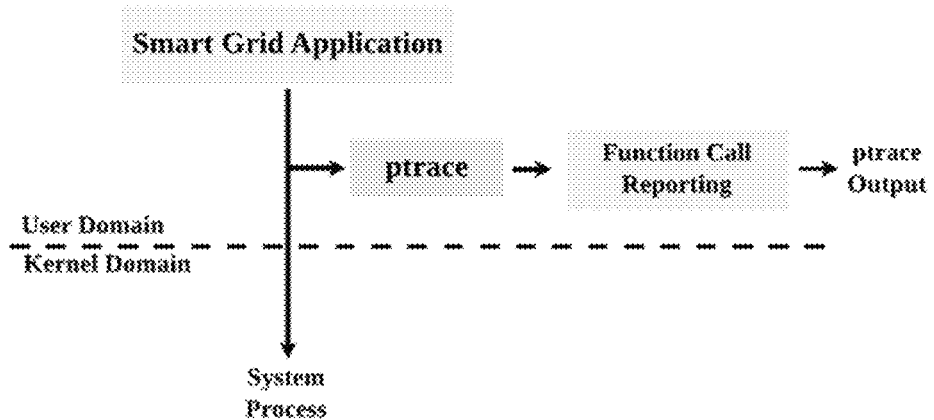
FIG. 3(b) is a diagram of system call tracing techniques of a framework of an embodiment of the present invention with library interposition implementation.

Frameworks of the present invention can utilize library interposition ((FIG. 3(a)) and Unix-based function call tracing techniques (ptrace) (FIG. 3(b)). These techniques allow for exploring deep at the kernel and user level to obtain valuable information about the type, amount, and order of system (and/or function) calls raised during the devices' communication processes (connection-exchange-termination). Specifically, three detection approaches can be utilized according to embodiments of the present invention: (1) direct system call comparison: the framework monitors and captures system calls from both genuine and unknown devices, and then compares both system call lists to look for extra system call activity that indicates the presence of a counterfeit or compromised device; (2) statistical-correlation-simple: the framework calculates the statistical correlation between system call lists from both genuine and counterfeit devices (low correlation will indicate the presence of counterfeit devices); and (3) statistical-correlation-advanced: in cases where a high level of entropy is present in the system call lists, the ability of the previous detection approach may be limited. Therefore, more advanced correlation techniques need to be applied. In this case, the framework can remove randomness and define new random variables based on the system call lists for both genuine and unknown (potentially compromised or counterfeit) devices. It can then calculate the statistical correlation between these new system call lists. In order to make the framework performance efficient in terms of time and computing resources, a use-when-needed principle is applied. That is, the three different detection approaches can be applied only when necessary. Specifically, to make the decision algorithm stronger, the outcomes from the first two detection methods can be applied and combined. In cases where the second detection method cannot be applied, the third detection approach can be used.

Figure 5:
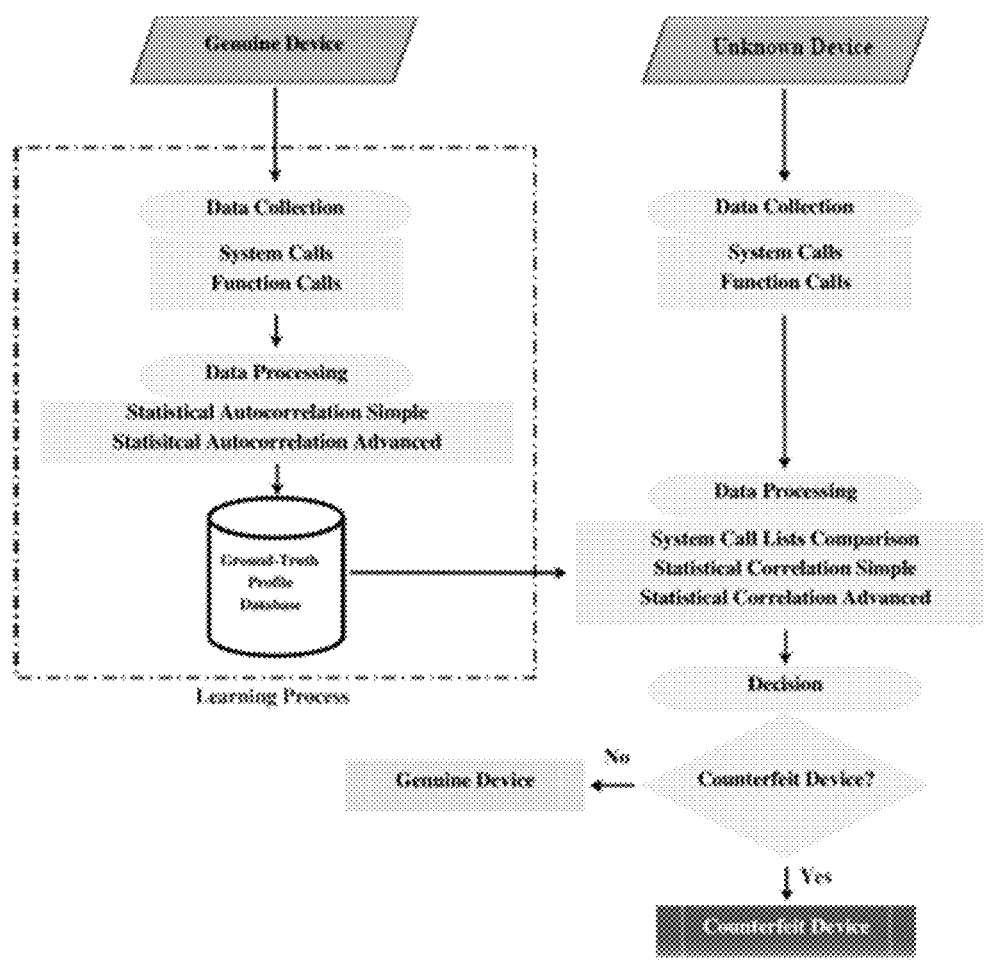
FIG. 5 is a diagram of a configurable framework of an embodiment of the present invention for monitoring and detecting counterfeit smart grid devices.

The first detection method is direct system call comparison (Detection-Method$_1$). The direct system call comparison approach directly compares the two smart grid devices (trusted and unknown) (FIG. 5) based on the type and frequency of system calls triggered during the device's interaction. It does not consider the order in which the system calls are triggered or the value of any parameters from the system call. In general, the execution of this approach is very light in terms of computing resources. Algorithm 1 shows how the direct system (and/or function) call comparison can be implemented. After variable initialization (lines 2 and 3), the algorithm applies Detection-Method$_1$. As part of this first approach, in line 6 the average number per system call (or of system/function calls) is calculated for both genuine and unknown devices. Then, the average number per system call from the counterfeit device is normalized against the average number per system call of the genuine device (line 8) or GTP (ground truth profile). If the vector resulting from line 8 has at least one element greater than 1, the flag compCalls is set to 1 (line 11). As per Detection-Method$_1$, a normalized value greater than 1 means extra system call activity has been detected and will potentially indicate the presence of a counterfeit device. After applying this detection mechanism, any extra system call activity from counterfeit devices should be detectable. Since one of the objectives of the present invention is to keep overhead as low as possible, the application of this simple approach can give the framework fast and effective decision criteria. However, in order to make the decision algorithm stronger, this approach can be combined with the second detection mechanism, below. At the end, the decision algorithm will consider the outcomes from both approaches.

ALGORITHM 1

Algorithm of Detection - Method$_1$ for resource-rich and resource-limited compromised smart grid device detection

```
1:      Detection - Method₁( )
2:         grdTh ← GTP_TASC
3:         cprom_list ← callTracing( )
4:         iterations ← 30 Approach1 :
5:         for i < iterations do
6:            cpromV_lists[i] ← μ(cprom_list)
7:         end for
8:         rate_list ← cpromV_lists/grdTh
9:         for j < rate_list.size do
10:           if rate_list[j] > 1 then
11:              compCalls ← 1
12:           end if
13:        end for
```

The second detection mechanism (Detection-Method$_2$) is statistical-correlation-basic. For stronger decision algorithms, frameworks of embodiments of the present invention can combine the previous detection approach with a second technique. This technique applies statistical correlation between system (and/or function) call lists from genuine and unknown (potentially counterfeit or compromised) devices. Statistical correlation will give valuable information on the mutual relationship or connection between system call activities from genuine and counterfeit (or compromised) devices. Specifically, the correlation will provide detailed information about the type of system call and the order in which the calls appear. This can offer advantages in comparison to the first detection approach. With the second detection approach, the order in which the system call appears constitutes an additional decision criterion, which is a configurable feature. To apply correlation, the system and function call lists can be converted into random variables. To complete this step, a different weight $\delta_i$ is assigned to different types of system calls in the order they appear. The assignment of $\delta_i$ weights can be done randomly or by following one or more specific assignment criteria.

The criteria can depend on the importance of the system calls, the type of application that is being evaluated, etc. (adaptive assignment). As a result of the assignment process, a random variable X can be obtained that takes values between $\delta_{min}$ and $\delta_{max}$ (this process corresponds to the function toRandomVar( ) in Algorithm 2, lines 5 and 10). This random variable describes the system call lists in terms of type of system calls and the order in which these calls are triggered. In a specific application, after finishing the conversion of system call lists to random variables, two different groups of variable are obtained. These two groups are: $X_0$ which describes the outcomes of the genuine device; and $Y_{1-6}$ which constitutes a group of random variables that describes the outcome of the six different counterfeit devices defined in the adversary model. Finally, the correlation between $X_0$ and $Y_{1-6}$ can be defined as:

$$\rho X_0 Y_i = \frac{\sum x_i y_i - n\overline{xy}}{n s_x s_y} \qquad (3)$$

where n represents the size of X and Y, x and y represents the mean, and $s_x$ and $s_y$ represent the standard deviation. One limitation of this detection approach is that (like in Detection-Method$_1$) it needs a genuine device that can be trusted (ground truth device).

ALGORITHM 2

Algorithm of Detection - Method$_2$ for resource-rich and resource-limited compromised smart grid device detection.

```
1:     Detection - Method2( )
2:     grdTh ← GTP_SCL
3:     cprom_list ← callTracing( )
4:     iterations ← 30
       Approach 2 :
5:     if grdTh ≠ null then
6:         for i < iterations do
7:             grdThV[i] ← toRandomVar(grdTh)
8:             cpromV[i] ← toRandomVar(cprom_list)
9:         end for
10:        corrXY ← p_{x,y}(cfeitV, grThV)
11:    end if
```

Algorithm 2 shows how Detection-Method$_2$ can be implemented. The approach starts by determining a trusted genuine device (ground truth device) that can be used as a reference to calculate the correlation between genuine and unknown devices in Line 5. If a GTP exists in the database then, in Line 8, the system/function call lists from both genuine and unknown devices are converted to a list of random variables grdThV and cpromV, respectively. Finally, in Line 10 the statistical correlation $\rho_{x,x}$ is calculated. As per Detection-Method$_2$, correlation values below 0.6 mean that the call lists from genuine and unknown devices are not highly correlated and will indicate the presence of a compromised device.

For this purpose, a database of different ground truth profiles (GTPs) can be created from genuine smart grid devices throughout the learning process. Different profiles can be created for different classes of devices that are performing different operations in the smart grid infrastructure. In order to be used for correlation analysis, the GTPs have to be obtained from smart grid devices that perform very stably while executing normal smart grid operations. In other words, the system/function call lists obtained from the same process and at different time intervals in the same device should be highly correlated. This metric provides valuable information about the level of randomness inherent to system/function calls in ground truth devices. Random changes in device behavior can be malicious activity from compromised devices. Genuine devices with high levels of randomness (low autocorrelation) between similar processes ran in different time intervals do not make good candidates for ground truth devices.

To calculate autocorrelation between system/function call lists, different weights $\delta_i$ can be assigned to different types of system/function calls in the order they appear. The assignment of $\delta_i$ weights can be done randomly or by following a specific assignment criterion. This criterion can depend on the importance of the specific call and the type of application that is being evaluated (adaptive assignment). As a result of the assignment process, a random variable X that takes values between $\delta_{min}$ and $\delta_{max}$. Finally, random variable X can be used to calculate the Statistical-Autocorrelation-Simple as described in Equation 9:

$$\rho X_i X_{i+t} = \frac{\sum x_i x_{i+t} - n \overline{x_i x_{i+t}}}{n s_{x_i} s_{x_{i+t}}}, \quad (9)$$

where $x_{i+t}$ represents a random variable from the same random process $x_i$, but from different time interval t. System/function call lists normally possess some degree of randomness. Particularly in the cases of resource-limited systems, this randomness can be higher because of limitations on available resources during demanding system operations. For resource-limited smart grid devices, finding high values of autocorrelation between similar processes running at different time intervals can be challenging. This is because the natural randomness of the OS' processes is enhanced by the lack of computing resources. This constraint could limit the framework's suitability for resource-limited smart grid devices. To overcome this issue, statistical-autocorrelation-advanced techniques can be applied. In this technique, the values X(i) to X(i+h) are combined in X, resulting in a new random vector $X_0$ that is smaller and has a lower random component. The index h represents the number of individual calls from the original list that are being combined to create the new random value. This index value h is proportional to the amount of randomness and constitutes another configurable parameter in the framework. Finally, once generated, the GTPs can include the following information: (1) type and amount of system/function calls (TASC) and (2) the entire system/function call list (SCL), both triggered during the learning process.

To be used in correlation applications, the ground truth device needs to have high autocorrelation values between different realizations of its own system call lists. Autocorrelation values will give an idea of how the system calls from the trusted device at any given moment will correlate with system call lists obtained from the same processes, but in different time intervals. This metric provides valuable information about the level of randomness inherent to system calls in potential ground truth devices. Genuine devices with high levels of randomness (low autocorrelation) should not be used as ground truth devices because the system call lists will differ too much between different realizations. That is, the result of applying correlation against counterfeit devices would throw different results every time. To calculate autocorrelation, Equation 3 can be used, with the difference that random variable $Y_i$ need to be replaced for a different realizations of the random variable $X_0$, that is:

$$\rho X_0 X_i = \frac{\sum x_i x_{i+t} - n \overline{xx'}}{n s_x s_{x'}} \quad (4)$$

where $x_{i+t}$ represents a random variable from the same random process as $x_i$ but from different time interval t.

Algorithm 2 shows how Detection-Method$_2$ is implemented. This approach starts by determining if there is a trusted genuine device (ground truth device) that can be used as a reference to apply correlation between genuine and counterfeit devices. In order to find the ground truth device, Detection-Method$_2$ starts by converting the system call lists from the genuine device into a list of random variables grdThV$_{lists}$ in line 5. The random variable is obtained after randomly assigning different weights $\delta_i$ to different types of system calls. After this step, the autocorrelation $\rho_{x,x}$ between the different realizations in grdThV$_{lists}$ is calculated in line 7. If the autocorrelation value is greater than 0.6 (moderate to high autocorrelation), then the ground truth device can be used as a reference. In line 10, the system call lists corresponding to the counterfeit device are converted to a list of random variables cfeitV$_{lists}$. This process follows the same assigning mechanism used to convert ground truth device's system call lists into random variables (see line 5). Finally, in line 12 the statistical correlation $\rho_{x,y}$ is calculated. As per Detection-Method$_2$, correlation values below 0.6 mean that the system call lists from genuine and counterfeit devices are not highly correlated and will potentially indicate the presence of a counterfeit device. System call lists normally possess some degree of entropy. Particularly in the cases of resource-limited systems, this entropy can be higher because of the limitation on available resources during demanding system operations. Before applying any of the previously discussed detection approaches, the proposed framework ensures that there is a ground truth device that can be used as a reference. That is, autocorrelation values between different realizations of genuine device system call lists are high (0.6 or more). For resource-limited smart grid devices, to find such values of autocorrelation can be challenging due to the natural randomness of the OS's processes. This limitation can limit the suitability of embodiments of the present invention for resource-limited smart grid devices. To overcome this issue, statistical-correlation-advance techniques can be applied.

ALGORITHM 3

Algorithm of Detection - Method$_3$ for resource-rich and resource-limited compromised smart grid device detection.

```
1:   Detection - Method3( )
2:     grdTh ← GTP_SCL
3:     cpromlist ← callTracing( )
4:     iterations ← 30
5:     h ← 1
6:     if grdTh ≠ null then
7:       for i < iterations do
8:         grdThV[i] ← toRandomVar(grdTh)
9:         cpromV[i] ← toRandomVar(cprom_list)
10:      end for
11:      for i < size/2 do
12:        cpromVRd[i] ← cpromV[j] + cpromV[j + h]
13:        j = j + 2
14:      end for
15:      if grdTh ≠ null then
16:        corrXY ← ρ_{x,y}(grdThV, cpromVRd)
17:      end if
18:    end if
```

The third detection method is (Detection-Method$_3$) statistical-correlation-advanced. In cases where GTP was obtained after applying statistical-autocorrelation-advanced techniques, a similar method can be used to correlate GTP and system/function call lists from similar unknown devices.

Algorithm 3 implements Detection-Method$_3$. In this method, the values cpromV [i] and cpromV [j+h] (Line 12) (observe that, in this particular case, h=1 was chosen in Line 5) are combined from the original random variable obtained in Detection-Method$_2$. This operation will result in new random variable lists cpromVRd that are smaller and have a reduced random component. The correlation-advanced value between ground truth and unknown devices is calculated in Line 16. In cases where autocorrelation values of genuine devices is too low ($\rho_{x,x}<0.6$), the application of a third detection method can be applied. In this approach, random activity from system call lists can be removed to increase the autocorrelation value of ground truth devices.

The random variable vector used in the previous subsection can consist of $X_N$ different values ranging from $\delta_{min}$ to $\delta_{max}$. If Xi to $X_{i+h}$ values from $X_0$ are combined, the result is a new vector $X_0'$ that is smaller in size and has lower entropy. The index h represents the number of individual calls from the original list that is being combined to create the new random value. This index value h is proportional to the amount of randomness that should be removed and constitutes another configurable parameter in frameworks of embodiments of the present invention. The third detection method can include first determining the right ground truth device and then comparing the correlation values between new $X_0$ and $Y_{1-6}$. Similarly, $Y_{1-6}$ are obtained following the same mechanism used to find $X_0$, but this time using the system call lists from the counterfeit devices. Algorithm 3 implements Detection-Method$_3$. As mentioned before, this detection approach attempts to remove randomness from system call lists. As a result, the autocorrelation value between different realizations of system call lists from ground truth devices will increase. The novel idea introduced here combines grdThV [j] with grdT hV [j+h] and cfeitV [i] with cfeitV [j+h] for the ground truth and counterfeit devices respectively (lines 7 and 8) (observe that in this particular case, h=1 is chosen in line 4). This operation will result in two new random variable lists (grThVRd and cfeitVRd) with smaller size relative to the original variables. In line 11, the autocorrelation value between the new system call lists defined for the ground truth device is calculated. If this new autocorrelation value is greater than 0.6, the correlation value between ground truth device and counterfeit device is finally calculated in line 13.

ALGORITHM 4

Decision algorithm for resource-rich and resource-limited compromised smart grid device detection.

```
1:   Decision( )
2:     compCalls ← Detection - Method1( )
3:     corrXY ← DetectionMethod2( ) ∨ Detection -
         Method3( )
4:     comprised ← 0
       Decision :
5:     if compcalls ∨ corrXY < β then
6:       comprised ← 1
7:     end if
```

Frameworks of the present invention can conclude with the execution of the decision making process. In this process, frameworks of the present invention utilize the results from the previous steps and determine whether the devices are counterfeit (or compromised) if the correlation values of system/function call lists between genuine and unknown devices fall under a configurable decision threshold (corrXY<β). Decision Algorithm 4 initializes compCalls variable with the results from Algorithm 1 and corrXY from either the results from Algorithms 2 or 3. If the flag resulting from Detection-Method$_1$ is TRUE (compCall←1) OR the correlation value after applying Detection-Method$_2$ (and 3) is lower than a particular configurable threshold (corrXY<0:6 in this case), the unknown device is determined to be compromised (or counterfeit) (lines 5 and 6 from Algorithm 4).

This process can include the execution of Decision Algorithm 4. This decision algorithm initializes the compCalls variable from Algorithm 1 and corrXY from either Algorithms 2 or 3. If the flag resulting from Detection-Method$_1$ is TRUE (compCall←1) or the correlation value after applying Detection-Method$_2$ (and 3) is lower than 0.6 (corrX Y<0.6), the device can be determined to be counterfeit (lines 5 and 6 from Algorithm 4).

The subject invention includes, but is not limited to, the following exemplified embodiments.

Embodiment 1

A framework (or method) for securing a smart grid comprising:

data collection including call tracing techniques (e.g., wherein a portion or all system calls raised during a time interval are traced and compiled, assembled, or listed);

data processing including identifying a genuine device (or real or ground truth device) and comparing and correlating the call lists of the real device with the call lists of unknown devices (i.e., potentially counterfeit or compromised devices); and determining whether the unknown devices are counterfeit or compromised.

Embodiment 2

The framework of Embodiment 1, wherein the genuine device is found, screened for, or determined using autocorrelation values between different realizations of the genuine device's own system call lists (determining the correlation of call lists from different time intervals of the genuine device). In one example, if the genuine device can be used as a reference if its autocorrelation is greater than 0.60 (a framework configurable parameter).

Embodiment 3

The framework of any of Embodiments 1 to 2, wherein the framework considers one, all or any combination of the following counterfeit or compromised devices: (1) Counterfeit Device 1 (C $D_1$): the resource-limited device creates additional instances of the publisher object and starts leaking information through parallel communication channels; (2) Counterfeit Device 2 (C $D_2$): the resource-limited device allocates small and unauthorized amounts of memory to create fake data and poison real measurements; (3) Counterfeit Device 3 (C $D_3$): the resource-limited device creates unauthorized hidden files to store critical information that is retrieved later by the attacker; (4) Counterfeit Device 4 (C $D_4$): the resource-rich device creates additional instances of the subscriber object and starts leaking information through parallel communication channels; (5) Counterfeit Device 5 (C $D_5$): the resource-rich device allocates small and unauthorized amounts of memory to create fake data and poison real measurements; (6) Counterfeit Device 6 (C $D_6$): the resource-rich device creates unauthorized hidden files to store critical information that is retrieved later by the attacker.

Embodiment 4

The framework of any of Embodiments 1 to 3, wherein the data processing includes comparing system and function call type, appearance frequency and/or the order in which system and function calls are raised.

Embodiment 5

The framework of any of Embodiments 1 to 4, wherein the call tracing techniques include dynamic library interposition and/or reverse engineering with ptrace.

Embodiment 6

The framework of any of Embodiments 1 to 5, wherein the data processing includes direct system (and/or function) call comparison (e.g., looking for extra system call activity that can indicate the presence of a counterfeit device). The number of system calls for each device can be averaged, normalized, and compared to the real device. Unknown devices can be compared to a genuine device based on type and frequency, or order or values of parameters of system calls. The order of system calls and/or the value of parameters from the system calls do not have to be considered (and in some embodiments are not considered).

Embodiment 7

The framework of any of Embodiments 1 to 6, wherein the data processing includes statistical-correlation-basic (e.g., calculating statistical correlation between system call lists from both genuine and counterfeit devices, wherein low correlation can indicate the presence of a counterfeit device). Statistical-correlation-basic can include analyzing the type of system calls and the order in which they appear. Different weights can be added for different types of system calls (e.g., depending on the importance or type of application of the system calls). A random variable X can be generated (which is between the minimum weight and the maximum weight) that describes the system call lists in terms of type and order of system calls. After converting the system call lists to a random variable, two groups of variables can be formed (one that describes the genuine devices and a second that describes each of the six counterfeit devices of the adversary model).

Embodiment 8

The framework of any of Embodiments 1 to 7, wherein the data processing includes statistical-correlation-advanced (e.g., when if there is a high level of entropy, randomness can be removed and new random variables describing the system/function call lists (system call lists) can be defined for both genuine and counterfeit devices. New statistical correlations can then be performed based on these new call lists). Statistical-correlation-advanced can be applied, for example, when autocorrelation of the genuine device is less than 0.60. $X_i$ to $X_{i+h}$ values from random variable X can be combined to form a new vector $X_0'$ that is smaller in size and has lower entropy. Index value h can be determined, which is proportional to the amount of randomness that should be removed and constitutes another configurable parameter in frameworks of embodiments of the present invention.

Embodiment 9

The framework of any of Embodiments 1 to 8, wherein in direct system call (and/or function) comparison the order of system calls and/or the value of parameters from the system calls are considered (or, in the alternative, not considered).

Embodiment 10

The framework of any of Embodiments 1 to 9, wherein the framework considers threats of information leakage, measurement poisoning, and store-and-send-later.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Frameworks of embodiments of the present invention were analyzed as a proof of concept. The results were obtained after averaging 30 different realizations for all covered scenarios. The scenarios included six different types of counterfeit devices based on three different threats and two different types of devices (resource-limited and resource-rich) as described in the adversary model.

The framework should be accurate and scalable. The former refers to the performance during counterfeit device detection and the latter refer to the ability of the framework to cope with high smart grid device diversity. FIGS. 13 and 14 summarize some of the system (and function) calls detected in the resource-limited and the resource-rich devices, respectively, after using Detection-Method1. In both cases, columns from 3 to 6 list the average rate of system calls normalized against the average rate corresponding to the ground truth device. Specifically, column 3 lists the values corresponding to the genuine device and columns from 4 to 6 the values corresponding to counterfeit devices ($CD_1$, $CD_2$, $CD_3$ for resource-limited devices and $CD_4$, $CD_5$, $CD_6$ for resource-rich devices), respectively. Any value greater than 1 (marked in gray) in columns 4 to 6 represents extra system call activity due to the presence of counterfeit operations. Extra system call activity reveals the presence of a counterfeit device. It can be noticed that, by using ptrace, the framework is able to identify all counterfeit devices. Successful detection was performed for both resource-rich and resource-limited smart grid devices. In the case of library interposition, only Counterfeit devices 1 and 4 ($CD_1$ and $CD_4$) were detected. In the other cases, variations on system call rates (in $CD_2$, $CD_3$, $CD_5$ and $CD_6$) were too small when compared to the genuine device.

Figure 6:
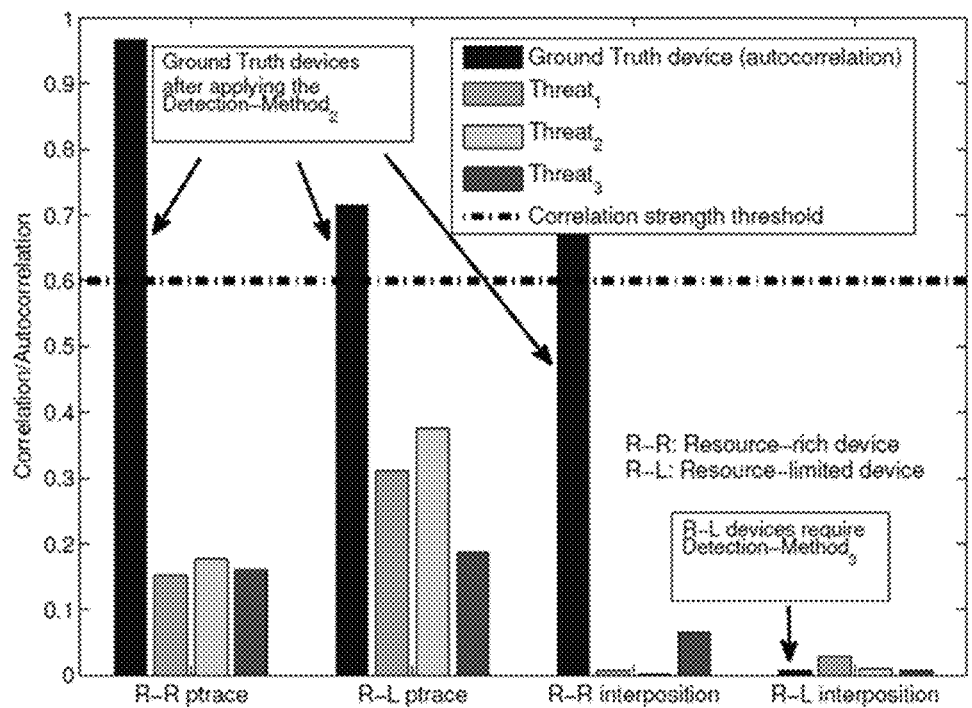
FIG. 6 is a graph showing the correlation between ground truth and counterfeit devices for both resource-rich and resource-limited devices as a result of using a second detection method of a framework according to an embodiment of the present invention.

As stated in the system model, the first detection method can be combined with Detection-Method$_2$ to strengthen the detection algorithm. FIG. 6 shows the results of applying correlation between system/function call lists of genuine and counterfeit devices. For successfully applying this detection approach, there needs to be a trusted genuine device, or ground truth device. A ground truth device can be found after obtaining high autocorrelation values ($\rho_{x,x}$>0.6) between 30 different realizations of system/function call lists on the same genuine device. Then, the ground truth device can be used as a reference for applying the second detection approach. Correlation values between ground truth and counterfeit devices are expected to be low ($\rho_{x,y}$<0.6). On the other hand, correlation values between ground truth and genuine devices are expected to be high ($\rho_{x,y}$>0.6).

Experimental results after applying Detection-Method$_2$ can be found in FIG. 6. It can be observed that, by using ptrace, it is possible to obtain really low correlation values (in the range from 0.15 to 0.35) between system (and function) call lists from genuine and counterfeit devices. By setting the correlation strength threshold at 0.6 (moderate to high correlation), the framework is able to detect all cases of counterfeit devices. For library interposition, the framework performs very well for resource-rich counterfeit devices. However, for resource-limited counterfeit devices Detection-Method$_2$ cannot be applied as a detection approach. In FIG. 6, autocorrelation values of ground truth devices are very low when library interposition is applied on resource-limited devices. Resource-limited systems generally have higher levels of randomness during kernel execution, which generally result in system call lists with a higher random component. These levels of randomness are what makes impossible to apply correlation approaches in this specific case (library interposition on resource-limited device).

Figure 7:
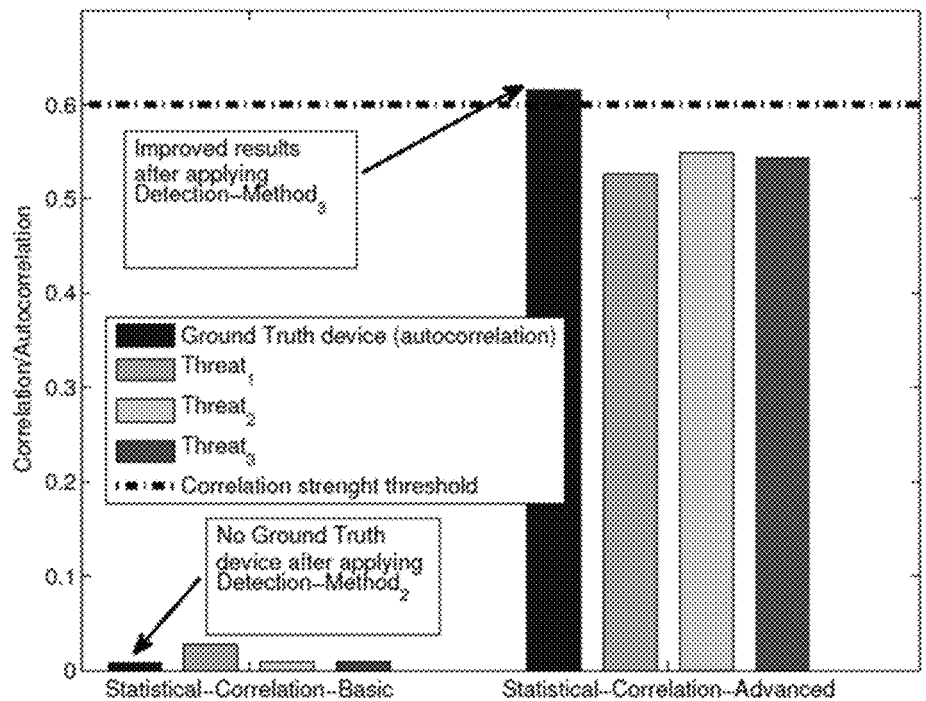
FIG. 7 is a graph showing Statistical-Correlation-Advanced between resource-limited ground truth and counterfeit devices as a result of using a third detection method of a framework according to an embodiment of the present invention.

In order to overcome this issue, the third decision method can be applied which utilizes statistical-correlation-advanced techniques. The statistical-correlation-advanced method removes randomness from the system call lists and increases the autocorrelation values between different realizations of the same ground truth device. This solution is not trivial, even when it appears to be simple. Removing randomness from system call lists can also take away valuable statistical information so this operation cannot be done arbitrarily. Experimental results after applying Detection-Method$_3$ show an important improvement on the autocorrelation values in resource-limited ground truth devices as seen in FIG. 7. By using this technique, frameworks of embodiments of the present invention are able to find a stronger reference to be used in the detection of resource-limited counterfeit devices. Finally, correlation between the ground truth device and the resource-limited counterfeit devices (for library interposition case) was applied. In FIG. 7, outcomes from Detection-Method$_2$ and Detection-Method$_3$ are compared for the case of library interposition applied on resource-limited devices. As can be observed, after applying Detection-Method$_3$, the framework obtained high autocorrelation values (over 0.6) for the ground truth device and low correlation values (under 0.6) after comparing the genuine device with the counterfeit device.

To measure the performance of frameworks of embodiments of the present invention, standard classification metrics of accuracy, recall, precision, and specificity were calculated. These metrics are shown in Equations 5, 6, and 7 respectively.

$$A_{CC} = \frac{(T_P + T_N)}{(T_P + T_N + F_P + F_N)} \quad (5)$$

$$R_{EC} = \frac{T_P}{(T_P + F_N)} \quad (6)$$

$$P_{REC} = \frac{T_P}{(T_P + F_P)} \quad (7)$$

$$S_{Pec} = \frac{T_N}{(T_N + F_P)}, \quad (11)$$

where $T_P$ stands for true positive or when it is determined that a counterfeit device is present; $T_N$ stands for true negative or when a device is determined to be genuine; $F_P$ stands for a false positive or when a genuine device is determined to be counterfeit; and $F_N$ stands for a false negative or when a counterfeit device is determined to be genuine.

In FIGS. 8, 9, 10, and 11 the standard classification metrics used to evaluate the experimental framework for all the six counterfeit devices are presented. For a better understanding, the evaluation results for resource-rich and resource-limited devices are represented. The results are also organized based on the type of call tracing techniques applied (library interposition or ptrace). In all cases, the performance of the experimental framework was evaluated for different values of correlation strength threshold (from a minimum of 0.3 to a maximum of 0.7). All results were obtained after 30 realizations for each scenario.

Figure 8:
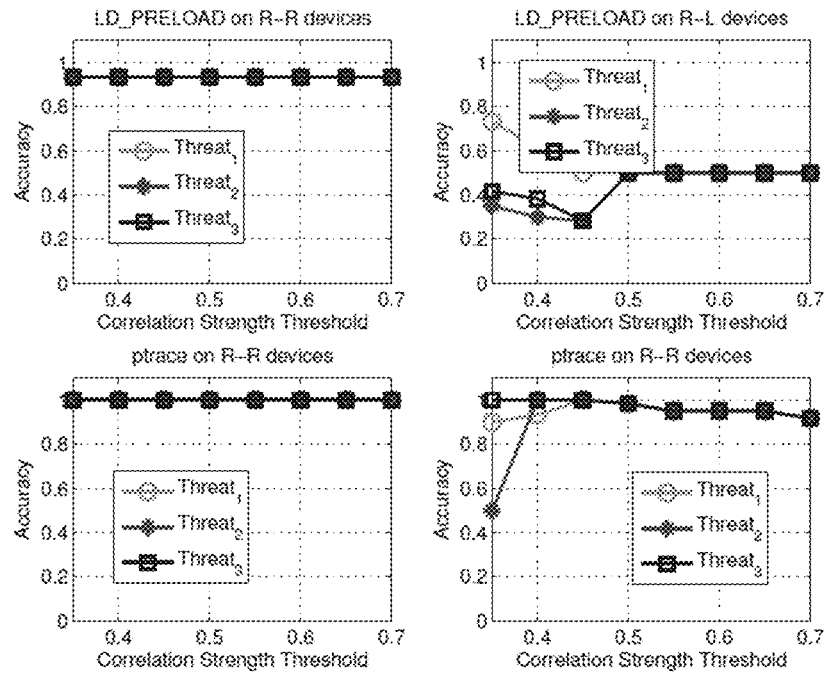
FIG. 8 shows graphs demonstrating the accuracy of detection methods of an embodiment of the present invention evaluated on six different counterfeit devices and using library interposition and ptrace as system call tracing techniques.

In FIG. 8, the overall performance of detection techniques of the present invention are evaluated over the six different counterfeit devices after using ptrace and library interposition. Since accuracy comprises true positive and negative results, this metric would describe how well the experimental framework is able to find ground truth devices to be used as a reference (i.e. TNs), and also how well these ground truth devices would perform when used as a reference to detect counterfeit devices. Useful conclusions can be arrived at after evaluating the accuracy of the results. First, the framework obtains a minimal value of accuracy in the range of 0.9, which is very good, and second, even when the best values are not obtained for the maximum value of threshold (0.6) in some cases (library interposition and ptrace for resource-rich and resource-limited devices respectively), results obtained for library interposition on resource-limited devices imposes 0.6 as an correlation threshold. As previously explained, these results were obtained after applying correlation-advanced techniques on high-entropy system call lists. Then, for simplicity in implementing the framework, an 0.6 threshold value is selected for the experimental setup.

Figure 9:
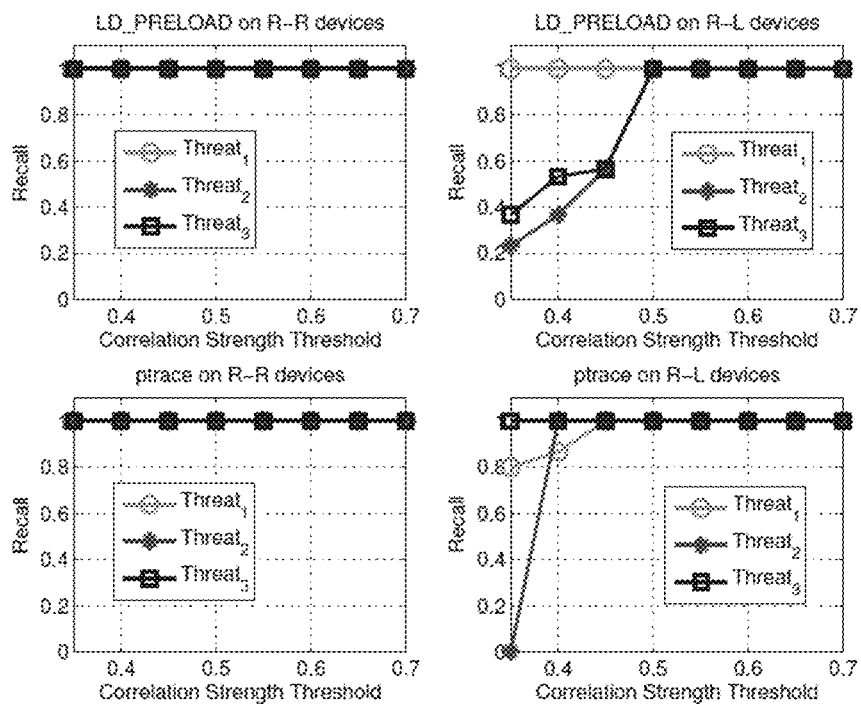
FIG. 9 shows graphs demonstrating recall of detection methods of an embodiment of the present invention evaluated on six different counterfeit devices and using library interposition and ptrace as system call tracing techniques.

In FIG. 9, recall classification metrics were evaluated for the experimental framework. Recall will specifically show how well the framework is able to detect the six counterfeit devices running with different resource-availability and after using different system call tracing techniques. Based on the results in recall metrics, it can be observed that the maximum possible value of true positives (30) $T_P$ is obtained in all cases for the selected correlation threshold (0.6). In the resource-rich devices, recall performance was stable over all threshold values. For the resource-limited devices, an increment in performance was observed while the threshold value was increased. Recall metric results (1.0 in all cases) demonstrated that the experimental framework was able to detect all counterfeit devices after combining the proposed detection techniques.

Figure 10:
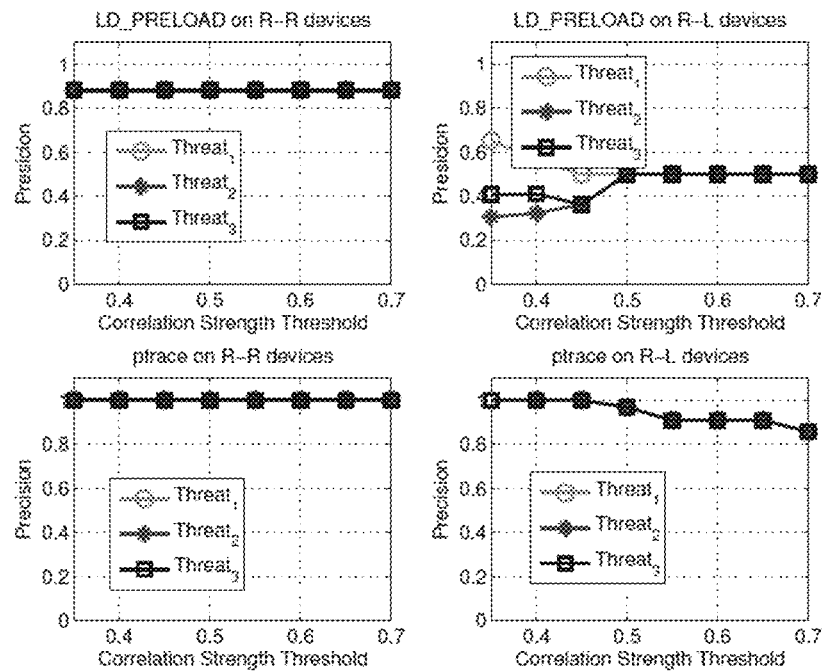
FIG. 10 shows graphs illustrating the precision of detection methods of an embodiment of the present invention evaluated on six different counterfeit devices and using library interposition and ptrace as system call tracing techniques.

FIG. 10 is a graph showing precision evaluation results of an embodiment of the present invention. This metric gives a better understanding of how the performance of frameworks of the present invention is affected by the quality of ground truth devices. Specifically, the precision demonstrates the statistical relationship between the number of compromised devices successfully detected versus the number of times that the framework failed in detecting a ground truth device. By looking at the precision results, it can be observed that the worst case scenario of resource availability combined with the kernel-based tracing technique (library interposition over resource-limited devices) has the lowest value of precision (0.5). Precision values confirm evaluation results obtained earlier in this section. For resource-rich devices, the framework performs very well, as well as for the resource-limited devices when ptrace is applied. Second, due to high values of randomness in resource-limited devices' system call lists, stronger decision techniques can be used to, first, find a strong enough ground truth device and, second, identify compromised devices with a high detection rate.

Figure 11:
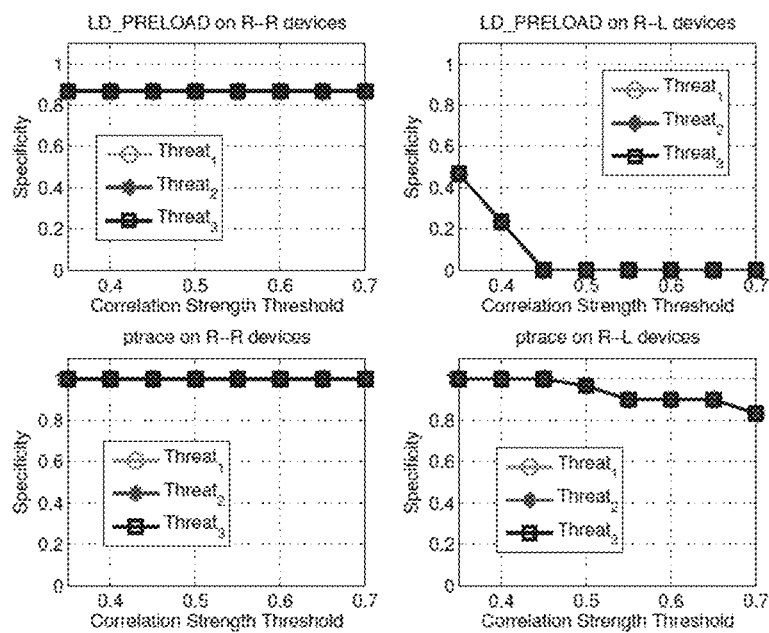
FIG. 11 shows graphs illustrating the specificity of detection methods of an embodiment of the present invention evaluated on six different counterfeit or compromised devices and using library interposition and ptrace as system/function call tracing techniques.

Specificity constitutes one of the best statistical metrics to evaluate the true negative rate, that is, to evaluate how the learning process performs while looking for ground truth devices. In FIG. 11 (top right), it can be observed how the resource-limited devices using library interposition degrades and makes it difficult to use statistical correlation-simple only to detect this particular case of compromised devices. Specificity 0 at a correlation threshold between 0.45 and 0.7 demonstrates that a ground truth device could not be found.

Figure 12:
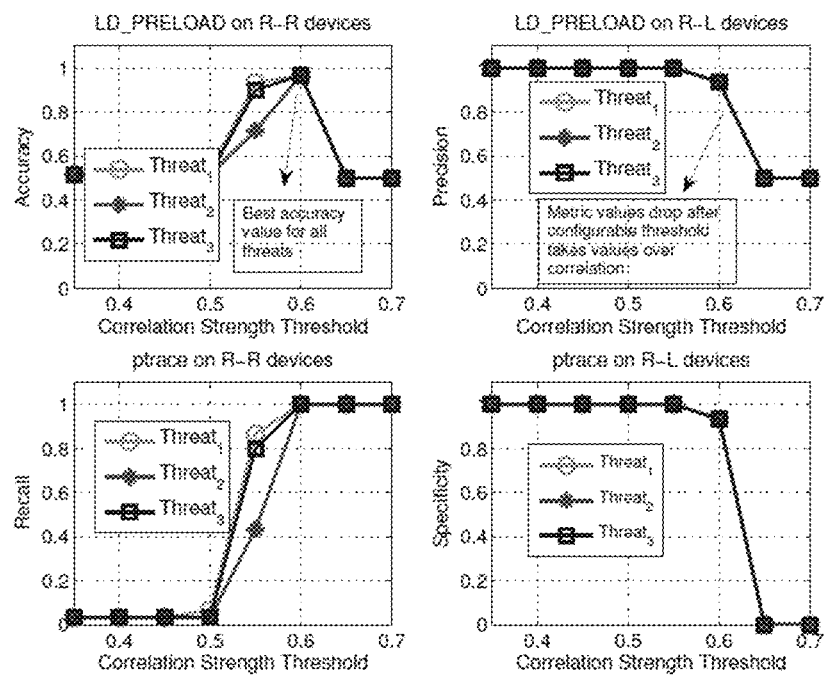
FIG. 12 shows graphs illustrating the performance metrics improvement after applying Statistical-Correlation-Advanced of an embodiment of the present invention evaluated on resource-limited counterfeit or compromised devices and using library interposition and ptrace as system/function call tracing techniques.

Finally, FIG. 12 describes the performance metrics of resource-limited devices when library interposition is used after applying the statistical-correlation-advanced (Detection—Method$_3$). From this figure, some important conclusions can be extracted: First, the correlation threshold of 0.6 gives excellent results for this particular testbed. The accuracy curve has a maximum peak of 0.96 for all the different threats analyzed at this particular threshold value. Second, an improvement in accuracy and precision can be observed compared to statistical-correlation simple (accuracy improved from 0.5 to 0.96 and precision improved from 0.5 to 0.93), drawn in earlier figures. Third, recall metrics kept its high performance at the selected threshold value (recall=1). Fourth, all metric values directly related with the quality of ground truth devices (accuracy, precision, and specificity) had diminished values after threshold=0.6. This behavior proves that for resource-limited devices, when library interposition is used, the average value of autocorrelation obtained from ground truth devices is always under 0.65. This conclusion suggests the utilization of 0.6 as the correlation strength threshold. Threshold values will highly depend on the behavioral characteristics of the devices in which the frameworks are applied and constitute another configurable property of the proposed framework.

TABLE II

AVERAGE SYSTEM OVERHEAD ON RESOURCE-RICH AND RESOURCE-LIMITED DEVICES WITH THE FRAMEWORK.

| | NF | | WF | | | |
|---|---|---|---|---|---|---|
| | value | value | ptrace (%) | | LI (%) | |
| Metrics | R-R | R-L | R-R | R-L | R-R | R-L |
| RT (s) | 60.00 | 60.11 | 0.05 | 3.8 | 0.01 | 0.1 |
| ST (s) | 0.49 | 3.60 | 8.1 | 3.6 | 10.2 | 5.5 |
| UT (s) | 0.31 | 0.49 | 16.1 | 0.31 | 64 | 2.0 |
| Mem (KB) | 1967.5 | 1827.5 | 1.1e−3 | 4.3e−5 | 3.0e−2 | 1.0e−3 |
| CPU (%) | 1 | 6.02 | 0 | 1.9 | 0 | 1 |

TABLE III

AVERAGE OF SYSTEM OVERHEAD ON RESOURCE-RICH DEVICES (E.G. PMUs, IEDS) AS A CONSEQUENCE OF USING OUR FRAMEWORK.

| | | WF | | | |
|---|---|---|---|---|---|
| | | ptrace | | LI | |
| Metrics | NF | value | % | value | % |
| Real time (s) | 60.00 | 60.03 | 0.05 | 60.01 | 0.01 |
| System time (s) | 0.49 | 0.53 | 8.1 | 0.54 | 10.2 |
| User time (s) | 0.31 | 0.26 | −16.1 | 0.33 | 6.4 |
| Memory (KB) | 1967.5 | 1971.0 | 0.1 | 2052 | 4.2 |
| CPU (%) | 1 | 1 | 0 | 1 | 0 |

The framework should be accurate and scalable, but it should not require too much overhead. Table II summarizes the average system overhead on resource-limited and resource-rich devices, respectively. The outcomes are obtained after comparing the performance of the devices with and without using the experimental framework. The results show how much overhead is introduced in the implemented smart grid scenarios while applying the proposed approaches. In these tables, NF (No Framework) represents when no framework was used and WF (With Framework) represents when the experimental framework was applied. Also, LI represents when Library Interposition was used as a tracing technique. In all the cases, the overhead was calculated as follows:

$$\%_{metric} = \frac{(\text{metric}_{WF} - \text{metric}_{NF})}{\text{metric}_{NF}} \times 100. \qquad (8)$$

In Table II, the results demonstrate that for resource-limited devices, even high-resource utilization techniques like library interposition do not significantly impact performance. For the specific cases of real, system, and user time, increments not greater than 230 ms were observed. For critical metrics like memory and CPU, the experimental frameworks of embodiments of the present invention used 0.03% more of the total memory and 1.9% more CPU processing power.

In summary, for resource-limited and resource-rich devices, library interposition introduces the most overhead to the system. However, this overhead is low in comparison to similarly proposed applications. To further study the impact of the experimental framework on real devices, the overhead was analyzed considering a real resource-limited smart grid device. In Table IV, the main specifications of Remote Terminal Unit RT2020 are summarized.

TABLE IV

SUMMARY OF PERFORMANCE OF OUR FRAMEWORK IN THE DETECTION OF RESOURCE-LIMITED COMPROMISED SMART GRID DEVICES.

|          | $CD_1$ |        | $CD_2$ |        | $CD_3$ |        |
|----------|--------|--------|--------|--------|--------|--------|
| Approach | LI     | ptrace | LI     | ptrace | LI     | ptrace |
| DM1      | ✓      | ✓      | X      | ✓      | X      | ✓      |
| DM2      | X      | ✓      | X      | ✓      | X      | ✓      |
| DM3      | ✓      | —      | ✓      | —      | ✓      | —      |

TABLE V

SUMMARY OF PERFORMANCE OF OUR FRAMEWORK IN THE DETECTION OF RESOURCE-RICH COMPRISED SMART GRID DEVICES.

|          | $CD_4$ |        | $CD_5$ |        | $CD_6$ |        |
|----------|--------|--------|--------|--------|--------|--------|
| Approach | LI     | ptrace | LI     | ptrace | LI     | ptrace |
| DM1      | ✓      | ✓      | X      | ✓      | X      | ✓      |
| DM2      | ✓      | ✓      | ✓      | ✓      | ✓      | ✓      |
| DM3      | —      | —      | ✓      | —      | ✓      | —      |

Looking at Table III, it can be concluded that in the worst case scenario (library interposition on a resource-limited device) the change in execution time as a result of implementing the experimental framework only represented up to 2.3 cycles and 0.1% of the total memory utilization.

Tables IV and V summarize the experimental results. In these tables, DM1 stands for Detection-Method1 (System/Function call comparison), DM2 stands for Detection-Method2 (Statistical-Correlation-Basic), and DM3 represents Detection-Method3 (Statistical-Correlation-Advanced). Frameworks of the present invention were able to combine three different approaches to detect different definitions of resource-rich and resource-limited counterfeit smart grid devices.

For resource-rich counterfeit devices, the experimental framework performed very well. In fact, only the first two detection methods listed in Algorithms 1 and 2 needed to be applied to successfully detect resource-rich counterfeit devices. Similar results were obtained with the resource-limited devices using ptrace. When using library interposition for the resource-limited counterfeit devices, an additional detection step may be needed. Due to the high entropy found in system call lists from resource-limited devices when library interposition is applied, it may be difficult to find a ground truth device to apply correlation. In this case, the experimental framework adopted the third detection approach. This approach utilized statistical-correlation-advanced techniques to remove randomness from resource-limited system call lists. After applying this technique, the framework was able to find a ground truth resource-limited device and correlate between genuine and counterfeit devices. Experimental results demonstrate that, even in this case, the experimental framework had excellent rates in the detection of counterfeit devices.

TABLE VIII

SUMMARY OF PERFORMANCE OF OUR FRAMEWORK IN THE DETECTION OF RESOURCE-RICH COUNTERFEIT SMART GRID DEVICES.

|          | $CD_4$ |        | $CD_5$ |        | $CD_6$ |        |
|----------|--------|--------|--------|--------|--------|--------|
| Approach | LI     | ptrace | LI     | ptrace | LI     | ptrace |
| SCC      | ✓      | ✓      | X      | ✓      | X      | ✓      |
| SCB      | ✓      | ✓      | ✓      | ✓      | ✓      | ✓      |
| SCA      | —      | —      | ✓      | —      | ✓      | —      |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] Y. Yan, Y. Qian, H. Sharif and D. Tipper, "A survey on cyber security for smart grid communications," IEEE Communications Surveys and Tutorials, vol. 14, pp. 998-1010, 2012.

[2] NIST Special Publication 1108r3, "NIST framework and roadmap for smart grid interoperability standards, release 3.0," September 2014.

[3] M. Mitchells, "Smart grid: a grid suitable for renewable energy," January 2016.

[4] D. van Opstal, U.S. Resilience Project, "Supply chain solutions for smart grid security: Building on business best practices." September 2012.

[5] F. Koushanfar and et al., "Can EDA combat the rise of electronic counterfeiting?" in Proc. of ACM/EDAC/IEEE Design Automation Con-ference. San Fransisco, Calif.: IEEE, 2012, pp. 133-138.

[6] A. Kanovsky, P. Spanik and M. Frivaldsky, "Detection of electronic counterfeit components," in 2015 16th Int. Scientific Conf. on Electric Power Engineering (EPE). Kouty nad Desnou: IEEE, May 2015, pp. 701-705.

[7] K. Huang, J. M. Carulli, and Y. Makris, "Counterfeit electronics: A rising threat in the semiconductor manufacturing industry," in ITC. IEEE Computer Society. IEEE, 2013, pp. 1-4.

[8] Y. Mo, T. Hyun-Jin Kim, K. Brancik, D. Dickinson, H. Lee, A. Perrig and B. Sinopoli, "Cyber-physical security of a smart grid infrastructure," in Proceedings of the IEEE, vol. 100. New York, N.Y., USA: IEEE, 2011, pp. 195-209.

[9] M. Q. Saeed, Z. Bilal and C. D. Walter, "An NFC based consumer-level counterfeit detection framework," in 2013 Eleventh Annual Int. Conf. on Privacy, Security and Trust (PST). Tarragona: IEEE, July 2013, pp. 135-142.

[10] Y. Obeng, C. Nolan and D. Brown, "Hardware security through chain assurance," in Design, Automation and Test in Europe Conf. and Exhibition (DATE). Dresden: IEEE, March 2016, pp. 1535-1537.

[11] U. Guin, K. Huang, D. DiMase, J. M. Carulli, M. Tehranipoor and Y. Makris, "Counterfeit Integrated Circuits: A Rising Threat in the Global Semiconductor Supply Chain," Proceedings of the IEEE, vol. 102, no. 8, pp. 1207-1228, July 2014.

[12] C. Kriger, S. Behardien and J. Retonda-Modiya, "A Detailed Analysis of the GOOSE Message Structure in an IEC 61850 Standard-Based Substation Automation System," Int. Journal Comp. Comm., vol. 8, no. 5, pp. 708-721, October 2013.

[13] IEC61850-7-1, "Communication networks and systems for power utility automation—Part 7-1: Basic communication structure—Principles and models," 2003.

[14] IEC 61850-8-1, "Communication networks and systems in substations—Specific Communication Service Mapping (SCSM) Mappings to MIMS (ISO 9506-1 and ISO 9506-2) and to ISO/IEC 8802-3," 2003.

[15] IEC 61850-1, "Communication networks and systems in substations Introduction and overview," 2003.

[16] IEC 61850-7-2, "Communication networks and systems in substations-Basic communication structure for substation and feeder equipment Abstract Communication Service Interface (ACSI)," 2003.

[17] M, Sillgith, "Open source library for IEC 61850: Release 0.9," February 2016.

[18] The smart grid interoperability panel—cyber security working group, "Introduction to NISTIR 7628: guidelines for smart grid cyber security," September 2010.

[19] D. Formby, P. Srinivasan, A. Leonard, J. Rogers, R. Beyah, "Whos in control of your control system? device fingerprinting for cyber-physical systems," in NDSS, February, February 2016.

[20] U. Guin, D. Forte, and M. Tehranipoor, "Anti-counterfeit techniques: From design to resign," in Proceedings of the 2013 14th International Workshop on Microprocessor Test and Verification. Washington, D.C., USA: IEEE Computer Society, 2013, pp. 89-94.

[21] J. O'Brien and K. Lehtonen, "Counterfeit mobile devices—the duck test," in 10th Int. Conf. on Malicious and Unwanted Software (MALWARE). Fajardo: IEEE, 2015, pp. 144-151.

[22] S. Fries, H. J. Hof and M. G. Seewald, "Security of the smart grid—enhancing IEC 62351 to improve security in energy automation control," Int. Journal on Advances in Security, vol. 3, 2010.

[23] X. Li, I. Lille, X. Liang, R. Lu, X. Shen, X. Lin and H. Zhu, "Securing smart grid: cyber attacks, countermeasures and challenges," IEEE Comm. magazine, vol. 50, pp. 38-45, 2012.

[24] W. Wang and Z. Lu, "Survey cyber security in the smart grid: Survey and challenges," Comput. Netw., vol. 57, no. 5, pp. 1344-1371, April 2013.

[25] M. H. Ligh, S. Adair, B. Hartstein and M. Richards, Malware Analyst's codebook and DVD: tools and techniques for fighting malicious code. Wiley Publishing, Inc., 2011.

[26] R. E. Faith and M. Kerrisk, "The Linux man-pages project: ld preload.so." [Online]. Available: http://man7.org/linux/man-pages/man8/ld.so.8.html.

[27] R. E. Faith and M. Kerrisk, "The Linux man-pages project: ptrace." [Online]. Available: http://man7.org/linux/man-pages/man2/ptrace.2.html.

[28] Y. Deng and S. Shukla, "Vulnerabilities and countermeasures—A survey on the cyber security issues in the transmission subsystem of a smart grid," Journal of Cyber Security and Mobility, vol. 1, pp. 251-276, 2012.

[29] N. Komninos, E. Philippou and A. Pitsillides, "Survey in smart grid and smart home security: issues, challenges and countermeasures," IEEE Communications Surveys and Tutorials, vol. 16, pp. 1933-1954, 2014.

[30] B. Sikdar and J. H. Chow, "Defending synchrophasor data networks against traffic analysis attacks." IEEE Transactions on Smart Grid, vol. 2, pp. 819-826, 2011.

[31] S. Sathyanarayana, W. H. Robinson, and R. Beyah, "A network-based approach to counterfeit detection." in IEEE International Conference on Technologies for Homeland Security, ser. HST, Waltham, Mass., 2013, NS.

[32] W. E. Cobb, E. W. Garcia, M. A. Temple, R. O. Baldwin and Y. C. Kim, "Physical Layer Identification of Embedded Devices Using RF-DNA Fingerprinting," in 2010—MILCOM 2010 Military Comm. Conf., San Jose, Calif., October 2010, pp. 2168-2173.

[33] Z. A. Collier, D. DiMase, S. Walters, M. M. Tehranipoor, J. H. Lambert, and I. Linkov, "Cybersecurity standards: Managing risk and creating resilience," Computer, vol. 47, no. 9, pp. 70-76, September 2014.

[34] R. B. Blunden, The Rookit arsenal: Escape and Evasion in the Dark Corners of the System, 2nd ed., J. B. Learning, Ed. Burlington, Mass.: Cathleen Sether, 2013.

[35] T. Garfinkel, "Traps and pitfalls: Practical problems in system call interposition based security tools," in In Proc. Network and Distributed Systems Security Symposium, 2003, pp. 163-176.

[36] K. Jain and R. Sekar, "User-level infrastructure for system call interpo-sition: A platform for intrusion detection and confinement," in In Proc. Network and Distributed Systems Security Symposium, 1999.

[37] G. Hunt and D. Brubacher, "Detours: Binary interception of win32 functions," in Proceedings of the 3rd Conference on USENIX Windows NT Symposium—Volume 3, ser. WINSYM'99. Berkeley, Calif., USA: USENIX Association, 1999, pp. 14-14.

[38] T. Kim and N. Zeldovich, "Practical and effective sandboxing for non-root users," in Proceedings of the 2013 USENIX Conference on Annual Technical Conference, ser. USENIX ATC'13. Berkeley, Calif., USA: USENIX Association, 2013, pp. 139-144.

[39] P. J. Guo and D. Engler, "Cde: Using system call interposition to automatically create portable software packages," in Proceedings of the 2011 USENIX Confer-

[40] E. Eskin, W. Lee and S. J, Stolfo, "Modeling System Calls for Intrusion Detection with Dynamic Window Sizes," in DARPA Information Sur-vivability Conference & Exposition II, 2001. DISCEX '01. Anaheim, Calif.: IEEE, June 2001, pp. 165-171.

[41] H. H. Feng, O. M. Kolesnikov, P. Fogla, W. Lee, and W. Gong, "Anomaly detection using call stack information," in Proceedings of the 2003 IEEE Symposium on Security and Privacy, ser. SP '03. Washington, D.C., USA: IEEE Computer Society, 2003, pp. 62-.

[42] N. A. Milea, S. C. Khoo, D. Lo, and C. Pop, "Nort: Runtime anomaly-based monitoring of malicious behavior for windows," in Proceedings of the Second International Conference on Runtime Verification, ser. RV'11. Berlin, Heidelberg: Springer-Verlag, 2012, pp. 115-130.

[43] R. Sekar, M. Bendre, D. Dhurjati, and P. Bollineni, "A fast automaton-based method for detecting anomalous program behaviors," in Proceedings of the 2001 IEEE Symposium on Security and Privacy, ser. SP '01. Washington, D.C., USA: IEEE Computer Society, 2001, pp. 144-.

[44] S. M. Ross, Probability Models for Computer Science, 1st ed. Orlando, Fla., USA: Academic Press, Inc., 2001.

[45] H. Corrigan-Gibbs and S. Jana, "Recommendations for randomness in the operating system or, how to keep evil children out of your pool and other random facts," in Proceedings of the 15th USENIX Conference on Hot Topics in Operating Systems, ser. HOTOS'15. Berkeley, Calif., USA: USENIX Association, 2015, pp. 25-25.

[46] Honeywell, "RTU2020 Remote Terminal Unit Specifications," October 2014.

What is claimed is:

1. A framework for securing a smart grid, the framework comprising:
    data collection comprising call tracing techniques and preparing call lists;
    data processing comprising identifying genuine devices and creating a ground truth profile (GTP) database through a learning process, and comparing and correlating call lists of the genuine devices and the GTP database with call lists of unknown devices; and
    determining whether the unknown devices are counterfeit or compromised,
    the GTP database comprising: a) type and amount of system and function calls; and b) an entire system and function call list, both a) and b) being triggered during the learning process.

2. The framework according to claim 1, the call tracing techniques comprising tracing and compiling all system and function calls over a time interval.

3. The framework according to claim 1, the genuine device being identified using autocorrelation values.

4. The framework according to claim 1, the data processing comprising comparing system and function call appearance frequency, and
    the data processing further comprising comparing an order in which system and function calls are raised.

5. The framework according to claim 1, the call tracing techniques comprising dynamic library interposition.

6. The framework according to claim 1, the call tracing techniques comprising reverse engineering with ptrace.

7. The framework according to claim 1, the framework considering threats of information leakage, measurement poisoning, and store-and-send-later.

8. The framework according to claim 2, the data processing comprising direct system and function call comparison, and
    the direct system and function call comparison not considering system or function call order and system or function call parameter values.

9. The framework according to claim 1, the GTP database including different GTPs created with respect to different classes of the genuine devices.

10. A framework for securing a smart grid comprising:
    data collection comprising call tracing techniques and preparing call lists;
    data processing comprising identifying genuine devices and creating a ground truth profile (GTP) database through a learning process, and comparing and correlating call lists of the genuine devices and the GTP database with call lists of unknown devices; the data processing further comprising direct system and function call comparison, a first statistical correlation for low entropy systems, and a second statistical correlation for high entropy systems; and
    determining whether the unknown devices are counterfeit or compromised,
    the GTP database comprising: a) type and amount of system and function calls; and b) an entire system and function call list, both a) and b) being triggered during the learning process.

11. The framework according to claim 10, the first statistical correlation comprising analyzing system call type and order.

12. The framework according to claim 10, the first statistical correlation comprising assigning weights for different types of system and function calls depending on system and function call importance and application.

13. The framework according to claim 10, the call tracing techniques comprising reverse engineering with ptrace.

14. The framework according to claim 10, the direct system and function call comparison not considering system and function call order and system and function call parameter values.

15. The framework according to claim 10, the second statistical correlation comprising removing randomness and creating new system and function call lists.

16. The framework according to claim 10, the genuine device being identified using autocorrelation values.

17. The framework according to claim 13, the call tracing techniques further comprising dynamic library interposition.

18. The framework according to claim 10, the GTP database including different GTPs created with respect to different classes of the genuine devices.

19. A framework for securing a smart grid, the framework comprising:
    data collection comprising call tracing techniques and preparing call lists, the call tracing techniques comprising call tracing and compiling all system and function calls over a time interval;
    data processing comprising identifying genuine devices and creating a ground truth profile (GTP) database through a learning process, and comparing and correlating call lists of the genuine devices and the GTP database with call lists of unknown devices;
    the data processing further comprising direct system and function call comparison that does not consider system and function call order and system and function call parameter values, a first statistical correlation for low entropy systems, and a second statistical correlation for high entropy systems;

the first statistical correlation comprising analyzing system and function call type and order, the first statistical correlation comprising assigning weights for different types of system and function calls depending on system and function call importance and application;

the second statistical correlation comprising removing randomness and creating new system and function call lists; and determining whether the unknown devices are counterfeit or compromised, the framework considering threats of information leakage, measurement poisoning, and store-and-send-later, and the GTP database comprising: a) type and amount of system and function calls; and b) an entire system and function call list, both a) and b) being triggered during the learning process.

20. The framework according to claim 19, the GTP database including different GTPs created with respect to different classes of the genuine devices.

* * * * *